(12) United States Patent
Carmel

(10) Patent No.: US 8,254,304 B2
(45) Date of Patent: Aug. 28, 2012

(54) CHANNEL CAPACITY ADAPTIVE REPEATER

(75) Inventor: Yuval Carmel, Tirat Ha'Carmel (IL)

(73) Assignee: QUALCOMM Incorporated, San Diego, CA (US)

(*) Notice: Subject to any disclaimer, the term of this patent is extended or adjusted under 35 U.S.C. 154(b) by 399 days.

(21) Appl. No.: 12/635,594

(22) Filed: Dec. 10, 2009

(65) Prior Publication Data

US 2010/0150166 A1    Jun. 17, 2010

Related U.S. Application Data

(60) Provisional application No. 61/122,388, filed on Dec. 14, 2008.

(51) Int. Cl.
  *H04B 7/14* (2006.01)
  *H04J 3/16* (2006.01)
  *H03M 13/00* (2006.01)

(52) U.S. Cl. .................. 370/315; 370/437; 714/755

(58) Field of Classification Search ............... None
See application file for complete search history.

(56) References Cited

U.S. PATENT DOCUMENTS

| | | | |
|---|---|---|---|
| 6,138,261 A * | 10/2000 | Wilcoxson et al. | 714/755 |
| 6,370,185 B1 * | 4/2002 | Schmutz et al. | 375/214 |
| 6,516,438 B1 * | 2/2003 | Wilcoxson et al. | 714/755 |
| 6,578,203 B1 | 6/2003 | Anderson, Jr. et al. | |
| 6,785,903 B1 | 8/2004 | Kuh | |
| 7,124,425 B1 | 10/2006 | Anderson, Jr. et al. | |
| 7,149,549 B1 | 12/2006 | Ortiz et al. | |
| 7,376,388 B2 | 5/2008 | Ortiz et al. | |

FOREIGN PATENT DOCUMENTS

| | | |
|---|---|---|
| EP | 0820159 A2 | 1/1998 |
| WO | WO0111797 A1 | 2/2001 |
| WO | WO2006066607 A1 | 6/2006 |

OTHER PUBLICATIONS

U.S. Appl. No. 12/569,792, filed Sep. 29, 2009.
DVB Organisation: "TM-NGHSM_004_HvsFLO.pdf", DVB, Digital Video Broadcasting, C/O EBU, Nov. 21, 2007, XPO17809419, Geneva-Switzerland Introduction Section II.D figure 7.
International Search Report and Written Opinion—PCT/US2009/067748-ISA/EPO-Feb. 3, 2011.

* cited by examiner

Primary Examiner — Clemence Han
(74) Attorney, Agent, or Firm — Ryan N. Farr

(57) ABSTRACT

Methods, systems, and apparatus, including computer programs encoded on computer storage media, for increasing data rate in a signal. In one aspect, a method includes receiving a mobile broadcast signal including inner code and outer code information; generating an adjusted mobile broadcast signal by adjusting a bit rate of the mobile broadcast signal through modifying at least one of: a modulation scheme associated with the mobile broadcast signal, the inner code information, and the outer code information; and transmitting the adjusted mobile broadcast signal.

57 Claims, 8 Drawing Sheets

CHANNEL CAPACITY ADAPTIVE REPEATER

The present Application for Patent claims priority to U.S. Provisional Patent Application Ser. No. 61/122,388, filed Dec. 14, 2008, entitled "Channel Capacity Adaptive Repeater," and assigned to the assignee hereof. The disclosure of the prior application is considered part of, and is incorporated by reference in, the disclosure of this application.

TECHNICAL FIELD

The present disclosure relates to increasing the effective data rate in a digital broadcast signal within a static environment.

BACKGROUND

Digital broadcasting communications systems in mobile environments are designed to transmit digital data over long distances. Data transmitted from broadcast towers may be augmented to assist with the handling of reception errors. For example, redundant versions of the data may be transmitted to provide additional opportunities for reception by mobile devices. As another example, the data can be augmented with check sums and forward error correction codes to assist with the recognition of reception side errors and the reconstruction of data following such errors. The inclusion of data related to such augmentations can reduce the effective data rate in communications system transmissions. Another method of reducing reception errors is to employ repeaters to increase the coverage of the transmitted signal.

Repeaters, or boosters, can be implemented to receive signals and re-transmit the signals at a higher level, a higher power, or both. Repeaters also can re-transmit signals onto the other side of an obstruction, so that the signal can cover longer distances. A repeater can be implemented as an analog device that amplifies an input signal, or as a digital device that amplifies, re-shapes, time-shifts, or performs a combination of these functions on a digital input signal for re-transmission. Repeaters do not attempt to interpret the data being transmitted. Instead, repeaters can decrease signal degradation in the digital broadcasting communications system by re-transmitting the received signal with additional power in a local environment. The boosted signal can improve the signal quality received by mobile devices operating with the local environment.

SUMMARY

This specification describes technologies relating to channel capacity adaptive repeaters. One innovative aspect of the subject matter described in this specification can be implemented in methods that include the actions of receiving a wide area broadcast signal including inner code and outer code information. Generating a local area broadcast signal by adjusting a bit rate of the wide area broadcast signal through modifying at least one of: a modulation scheme associated with the wide area broadcast signal, the inner code information, and the outer code information. Transmitting the local area broadcast signal. Other implementations of this aspect include corresponding systems, apparatus, and computer programs, configured to perform the actions of the methods, encoded on computer storage media.

These and other implementations can each optionally include one or more of the following features. Transmitting the local area broadcast signal can occur in a different frequency than a frequency associated with the received wide area broadcast signal. Local content can be multiplexed with the local area broadcast signal. The multiplexed local content can be inserted in bit space vacated by modifying at least one of: the inner code information, and the outer code information. Modifying the modulation scheme associated with the wide area broadcast signal can include switching to a subcarrier modulation scheme supporting a higher bit rate. Switching to the subcarrier modulation scheme can include switching from a QPSK subcarrier modulation scheme to a 16-QAM subcarrier modulation scheme. Modifying the inner code information can include increasing a ratio of data bits to the total bits transmitted. Increasing the ratio of data bits to the total bits transmitted can include reducing redundant inner code bits. Modifying the outer code information can include increasing a ratio of data bits to the total bits transmitted. Increasing the ratio of data bits to the total bits transmitted can include reducing redundant outer code bits. The wide area broadcast signal can include at least one of: wide area operational infrastructure content, and local area operational infrastructure content. Transmitting the local area broadcast signal occurs in an area smaller than an area associated with the received wide area broadcast signal. Corresponding systems, apparatus, and computer programs encoded on computer storage media, also can include one or more of the described features.

Particular implementations of the subject matter described in this specification can be implemented to realize one or more of the following potential advantages. Inner and outer code information, also referred to as protection layers, protect data transmitted over long distances by carrying excess, or redundant, information to provide additional opportunities for reception by mobile devices. The inventor recognized that the protection layers can be reduced when data is transmitted over shorter distances, or within a confined area, such as a venue, or micro-venue. Reducing, or removing, protection layers can increase an effective data rate for a signal. For example, by increasing a bit rate of a wide area analog or digital signal, the effective data rate for the signal can be increased. The bit rate can be increased by reducing the outer code information, such as overhead data, within the signal during encoding. The bit rate also can be increased by reducing the inner code information, or payload data, within the signal during encoding. In addition, the bit rate can be increased by marginally increasing the inner code information while considerably decreasing the outer code information during encoding, and vice versa. A turbo encoder can decrease the code rate by increasing the ratio of data bits to the total number of bits transmitted. The reduction of redundant parity bits and inner code information can generate vacant space in the analog baseband signal or digital bit stream so that additional data can be multiplexed into the wide area signal. A multiplexer, in communication with a local storage device, can insert content stored at the local storage device into the vacancies recovered from the reduction, or removal, of the redundant data.

Additionally, the bit rate can be increased by changing the modulation of the signal. A modulator or subcarrier modulator can switch from a particular modulation scheme to another modulation scheme supporting a higher bit rate. For example, the modulator or subcarrier modulator can switch from a modulation scheme supporting a lower bit rate, such as a QPSK subcarrier, to a modulation scheme supporting a higher bit rate, such as a 16-QAM subcarrier. Moreover, an adaptive repeater can add new content, locally, to a predefined broadcast signal. The adaptive repeater can add the new content in limited areas under predefined data rate constraints. Furthermore, the adaptive repeater can replace poor quality content with the same content having higher quality properties.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
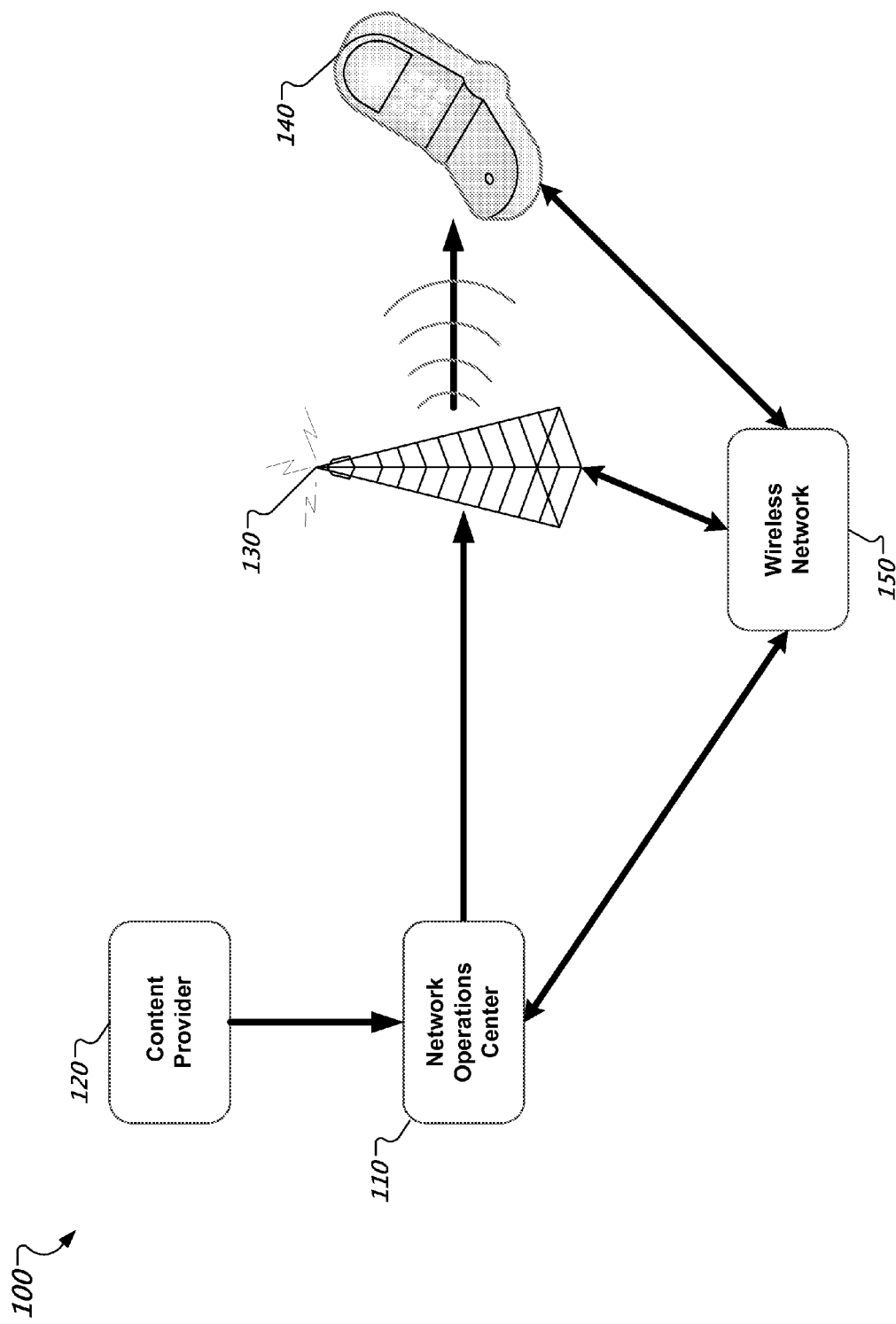
FIG. 1 shows an exemplary mobile broadcast system.

FIG. 1 shows an exemplary mobile broadcast system 100. The mobile broadcast system operates in accordance with the standards published by the FLO forum, and in particular is typified by the MediaFLO™ broadcast system by Qualcomm Incorporated of San Diego, Calif. Using a cellular standard, such as GSM or CDMA, enables MediaFLO to provide security and services utilizing unicasting associated with a wireless paradigm. The MediaFLO mobile broadcast platform delivers content across a mobile environment. MediaFLO utilizes a combination of broadcast and wireless paradigms to provide business opportunities within a mobile broadcast ecosystem. Using the Forward Link Only (FLO) air interface standard, MediaFLO provides greater content capacity and reduced content delivery costs associated with broadcasting paradigms.

MediaFLO, or FLO™, technology is designed to meet the mobile entertainment requirements of end users and service providers, by, for example, providing television services to end users and features designed to facilitate monetization by service providers. MediaFLO provides a broad range of content to mobile devices in a spectrally efficient, cost-effective and designed for low power consumption system. For example, the MediaFLO system can deliver streaming television, video and audio, Clipcast™ video and audio, and real-time Internet Protocol (IP) data services to MediaFLO compatible mobile devices. The mobile devices can selectively receive, display, play, store and manipulate the content delivered over the mobile broadcast system 100. Devices usable with the MediaFLO system include smartphones, cellular phones, personal digital assistants (PDA), interactive game devices, notebooks, smartbooks, netbooks, data processing apparatus, or other such electronic devices.

MediaFLO also can be configured to group programming into one or more subscription packages. Users, or subscribers, operating MediaFLO compatible mobile devices can select one or more of the MediaFLO subscription packages. For example, reception and decoding of channels included in a MediaFLO subscription package can be enabled in response to user input, e.g., touching a touchscreen on a MediaFLO compatible mobile device. Any number of conditional access solutions (CAS) can be utilized for controlling access to MediaFLO content and services. Additionally, the mobile broadcast system 100 can maintain quality by providing service flexibility with variable bit rate encoding. Variable bit rate encoding balances bandwidth, which is important to the service operator, with high-quality audio and video, which makes the end user experience more enjoyable.

MediaFLO end user services can include real-time content delivery, such as video and audio presentations, audio only programming and audio with slides programming. In some implementations, the real-time services can include enhanced H.264 video and AAC+ audio formats. End user services also can include non-real-time content delivery, such as network scheduled delivery of audio clips, e.g., MP4, and multimedia files, e.g., JPEG, PNG and HTML. Non-real-time services generally comprise the mobile device capturing specific pieces of multimedia and other data for presentation at a later time. For example, a non-real-time service called "clipcasting" provides network scheduled delivery of data services and files, such as wallpaper or e-coupons, for capture by a mobile device. Additionally, Clipcast can be implemented to deliver multimedia clips with multi-presentation views, e.g., from a plurality of perspectives, to a mobile device in accordance with a network schedule.

The mobile broadcast system 100 also can enable audio and video clips, or multimedia clips, to be stored at the MediaFLO compatible mobile device in internal memory, external memory, or both. End users can view, listen and play any stored clip that has not expired. In some implementations, the mobile device can include a file cache size that is configurable by the service operator, the end user, or both.

Additionally, MediaFLO can offer end user IP data services, such as FLO network delivery of Internet traffic to third-party applications. Third-party mobile applications can provide end users with dynamic home pages, that include, e.g., stock, news, weather and sports information. For example, the delivery of IP data services can enable stock tickers to be tailored to a user's specific profile. Additionally, MediaFLO can be integrated with two-way data exchange applications, such as text and voice chat, live voting, email and web browsing, video-on-demand and shopping, in addition to other interactive mobile application features. With such interactivity, a user can obtain additional information associated with the real-time or non-real-time programming. For example, a dinner recipe may be downloaded during the broadcast of a cooking show and shared with a user's friends, e.g., via a SMS message.

Referring once again to FIG. 1, the mobile broadcast system 100 generally comprises multiple nodes 110-140 that communicate, for example, over a wireless network 150. The wireless network 150, also referred to as a "wireless communication system," encompasses both the physical network as well as digital signal technology. The wireless network 150 can be implemented as: a code division multiple access (CDMA) system; a frequency division multiple access (FDMA) system; a time division multiple access (TDMA) system such as Global System for Mobile communications (GSM), GSM/General Packet Radio Service (GPRS), Enhanced Data GSM Environment (EDGE) or Terrestrial Trunked Radio (TETRA); a Wideband CDMA (WCDMA) system; Evolution Data Optimized (EV-DO) systems such as 1xEV-DO, EV-DO Rev A or EV-DO Rev B; High Speed Packet Access (HSPA) systems such as High Speed Downlink Packet Access (HSDPA), High Speed Uplink Packet Access (HSUPA) or Evolved High Speed Packet Access (HSPA+); a Long Term Evolution (LTE) system; or other communications systems, such as a system utilizing 3G or 4G technology. Content distributed over the interconnected nodes 110-140 can be selectively received, transmitted, processed, stored and displayed.

The nodes of the mobile broadcast system 100 generally comprise a network operations center 110, one or more content providers 120, one or more FLO transmitters 130 and a plurality of mobile devices 140. The network operations center 110 can include one or more receivers (not shown) configured to receive content from one or more content providers 120. In some implementations, the receivers can reside at the network operations center 110. For example, the network operations center 110 can include a C-band receiver configured to receive content delivered by a C-band satellite content provider 120. In other implementations, the receivers can be located remotely from the network operations center 110 and can deliver the received content to the network operations center 110 using wired or wireless technology. The content received from the one or more content providers 120 can include local and national content. The local and national content can include real-time, non-real-time and IP data services content.

The real-time content can be received from C-band and Ku-band satellites, terrestrial broadcast transmitters, and data networks, in addition to other such transmitting devices and networks. The real-time content can include video, such as MPEG-2 over asynchronous serial interface, or YUV over serial digital interface. The real-time content also can include audio, such as AC-3 or MP2 over ASI, as well as PCM over SDI. Additionally, real-time content formatted in NTSC and PAL technologies can be delivered to the network operations center 110. Real-time MediaFLO content and services can be implemented to bring television experiences, similar to those experienced on a traditional television, to a mobile device. For example, the television experiences can include general entertainment programming, such as live sporting events, news, music concerts and weather updates.

Similarly, non-real-time content formatted in MPV, such as MPEG-4 audio and video clips, and data services via Clipcast (DSvC), such as JPEG, PNG and HTML files, also can be received at the network operations center 110. The network operations center 110 can process the non-real-time content and can schedule network delivery of the content to one or more mobile devices. MediaFLO's non-real-time content and file delivery can extend the user experience to include short clips, e.g., YouTube™ videos, and files of non-real-time content, e.g., stored audio files.

In addition, MediaFLO can be implemented to deliver IP data services content, such as stock tickers, weather and news updates to the network operations center 110. The IP data services content can include a broad range of information accessible to each MediaFLO subscriber. In some implementations, the IP data services content can be tailored to a user's specific profile. For example, a MediaFLO subscriber can choose to receive particular IP data services content, such as weather and sports scores, at their MediaFLO compatible mobile device. Both the non-real-time and IP data services content can be delivered to the network operations center 110 over one or more data networks.

In some implementations, the network operations center 110 can aggregate the content received from the one or more content providers 120. In some implementations, the network operations center 110 can include additional content, such as locally stored content in the multiplexed content data stream. The aggregated content can be multiplexed at the network operations center 110 and distributed as a content data stream to one or more FLO transmitters 130. The one or more FLO transmitters 130 can receive the multiplexed content data stream from the network operations center 110. Based on the multiplexed content data stream, the FLO transmitters 130 can generate one or more FLO waveforms. The one or more FLO waveforms can be transmitted to one or more mobile devices 140.

Text, graphical and video content received from the FLO transmitters 130 can be displayed on a display screen at the mobile device 140. Audio content received from the FLO transmitters 130 can be played back at one or more audio outputs at the mobile device 140. The mobile device 140 can include an external and internal memory module that can store the received content. In some implementations, the mobile device 140 can communicate with the network operations center 110 over a reverse link, such as the wireless network 150. The reverse links can be used to communicate information for mobile device 140 activations, service key distribution, subscriptions and usage tracking.

Figure 2:
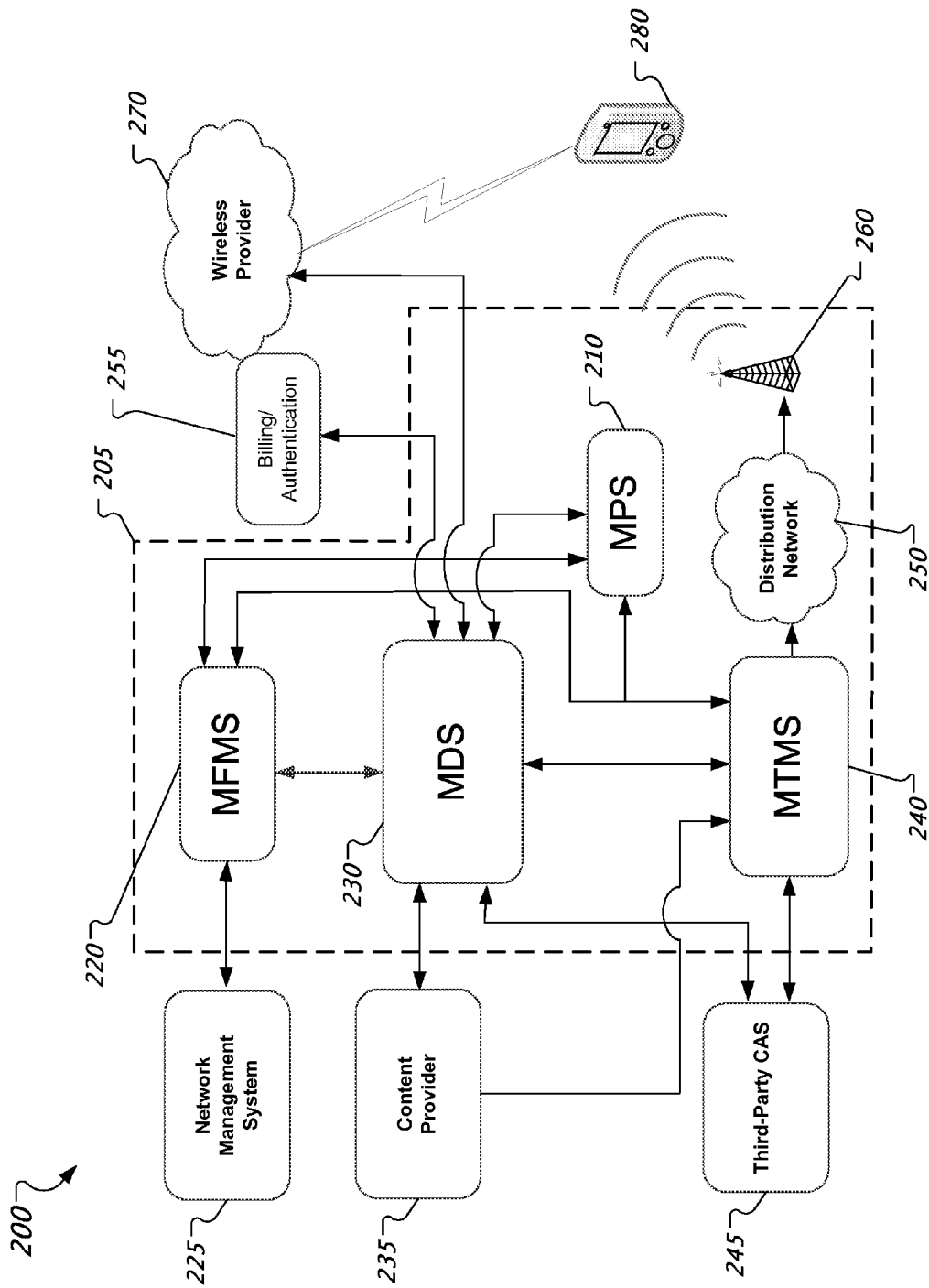
FIG. 2 shows an exemplary MediaFLO system logical architecture.

FIG. 2 shows an exemplary MediaFLO system logical architecture 200. The MediaFLO system logical architecture 200 includes one or more systems, subsystems and components, a subset of which constitute a MediaFLO network 205. The MediaFLO network 205 generally comprises a MediaFLO Provisioning System (MPS) 210, a MediaFLO Management System (MFMS) 220, a MediaFLO Distribution System (MDS) 230, and a MediaFLO Transcode and Multiplex System (MTMS) 240. The MediaFLO network 205 may be implemented in the network operations center 110 depicted in FIG. 1. The MediaFLO network 205 also includes a FLO Radio Access Network (RAN) subsystem, comprising the MTMS 240, a distribution network 250 and one or more FLO transmitters 260. The MediaFLO network 205 can be implemented to deliver real-time, non-real-time and IP data services content to one or more mobile devices, such as a MediaFLO device 280.

The MPS 210 provides one or more interfaces for an operator to configure the MediaFLO network 205. The MPS 210 distributes the MediaFLO network 205 configuration to the various systems, subsystems and components included in the MediaFLO network 205. In some implementations, the MPS 210 can provide one or more web services programming interfaces. Web and software developers can generate custom web services applications through the web service programming interface. For example, a MediaFLO developer using the MPS 210 programming interface can generate and offer custom subscription packages to MediaFLO subscribers. In addition, the MPS 210 can share data and information, i.e., transmit to and receive from, with the MFMS 220, the MDS 230 and MTMS 240.

The MFMS 220 performs the operations, administration and maintenance functions for the MediaFLO network 205. Specifically, the MFMS 220 can monitor the systems constituting the MediaFLO service platform, i.e., the MPS 210, the MDS 230 and the MTMS 240. Components outside the MediaFLO service platform can be monitored by other systems, subsystems or components. The MFMS 220 can provide management interfaces to enable network, state, fault, security, performance and log management within the MediaFLO network 205. Network management can include discovering new networks and nodes to monitor, deleting monitored nodes, controlling MediaFLO agents and components, such as reset counters, restarting components and terminating components. For example, the MFMS 220 network management interface can be used to communicate with and control the network management system 225. The network management system 225 can be implemented to manage the MediaFLO network 205 within, or external to, the MediaFLO network 205.

State management can include monitoring the high availability state of MediaFLO components, managing the administrative state of MediaFLO components and monitoring the operational state of MediaFLO components. Fault management can include managing events, alarms and alarm maps, as well as performing fault recovery. For example, a network operator can clear one or more alarms using a client interface associated with the fault management server component of the MFMS 220. Security management can include controlling operator access to the element management system and fault management system. Performance and log management can include collecting statistics from MediaFLO components, providing threshold-based monitoring, and providing reports and graphical views for the Key Performance Indicators (KPI) generated from the statistics. KPIs can be derived from the statistics and can define and measure progress toward organizational goals. In addition, the MFMS 220 can share data and information with the MDS 230 and the MTMS 240.

The MDS 230 provides efficient distribution of encrypted content across one or more wireless networks. The wireless networks can include data optimized (DO) networks, DO-multicast networks, 3G or 4G networks and FLO networks. The MDS 230 can maintain responsibility for aggregation and distribution of real-time content, non-real-time content, IP data services content, subscription services management and FLO resource scheduling. Additionally, the MDS 230 can be implemented to perform configuration management for the MediaFLO network 205. The MDS 230 also can include one or more of the following subsystems: distribution; digital rights management (DRM); subscription, billing and service management; unicast request handling; and usage tracking.

The MDS 230 distribution subsystem interfaces with one or more content providers 235 to receive real-time, non-real-time, and IP data services content from the one or more content providers 235. The MDS 230 functions to provide a single user interface for streaming, Clipcast and IP data services content. In some implementations, the MDS 230 distribution subsystem manages files, clips and data content delivery. The distribution subsystem may also receive and consolidate program guide data from the content provider 235 and other sources, e.g., Tribune Media Services. The consolidated guide is termed a MediaFLO Program Guide (MPG) and can be implemented as an easy to use guide that contains program description and file delivery information associated with MediaFLO end users. The MDS 230 distributes the content, the MPG, and subscription information to one or more mobile devices using a FLO transmitter 260 or via a wireless provider 270.

The MDS 230 also can generate system information, such as overhead information, and can initiate distribution of the overhead information. In addition, the distribution subsystem can receive Clipcast content from content providers and can schedule clip delivery to mobile devices, such as a MediaFLO device 280, during contact windows. The distribution subsystem also can encrypt content for conditional access and apply forward-error-correction (FEC) encoding to improve reception probability at the MediaFLO device 280. Additionally, the distribution subsystem can be implemented to deliver content based on a network, or content provider, delivery schedule.

The MDS 230 DRM subsystem can distribute encryption keys to MediaFLO network 205 components. In addition, the DRM subsystem can securely distribute decryption keys to one or more MediaFLO devices 280. The DRM subsystem also can synchronize with one or more the third-party CAS 245. Third-party CAS 245 can provide protection of services on a per-user basis. For example, a third-party CAS 245 can blackout specific programs in certain regions, or restrict content available to a particular market.

The MDS 230 subscription, billing and service management (SBSM) subsystem can be implemented to make subscription-based billing predictable and readily understood. The SBSM subsystem can manage and provide MediaFLO content package subscriptions. For example, the SBSM subsystem can provide subscription services and a back-end billing interface 255 for the MediaFLO network 205. The back-end billing interface 255 can include billing and authentication information, in addition to authorization and accounting functions. Additionally, the SBSM subsystem can provide MediaFLO service management and can generate new and custom subscription packages. The SBSM subsystem can receive subscription information from one or more mobile devices. In some implementations, the SBSM subsystem can activate MediaFLO services for one or more subscribing mobile devices.

The MDS 230 unicast request handling subsystem can be implemented to manage functions related to unicast device-to-server interface protocols. The unicast request handling subsystem includes a unicast configuration server (UCS) and a usage tracking service request handler (UTSRH). The UCS can receive provisioned application upgrade information sent from the MPS 210. In some implementations, the MPS 210 maintains all application version information, whereas the UCS only maintains the latest application version information. The MediaFLO device 280 generally receives application upgrade notifications via, e.g., a multicast notification delivery path from the wireless provider 270. However, when the MediaFLO device 280 application version is out-of-date, the MediaFLO device 280 can perform an application upgrade check via a unicast connection to the UCS to obtain the latest version information. The UTSRH can collect service usage and performance statistics from MediaFLO-enabled mobile devices. For example, the MediaFLO device 280 can be instructed to log usage events and upload the logged usage tracking statistics to the UTSRH. The UTSRH can collect the usage tracking statistics from the MediaFLO device 280 and can forward the usage tracking log to the usage tracking subsystem. In some implementations, usage tracking parameters can be transmitted to the MediaFLO device 280 as part of the notification flow. The MediaFLO device 280 can decide what events to log and when to log the usage tracking statistics based on the usage tracking parameters.

The MDS 230 usage tracking subsystem can receive the MediaFLO device's 280 upload data from the UTSRH and can log the data in persistent storage. In some implementations, the usage tracking subsystem can collect upload data directly from the one or more MediaFLO-enabled mobile devices. The usage tracking subsystem can be implemented to share at least a portion of the usage tracking statistics with one or more third-party entities. In some implementations, the third-party entities can use the usage tracking statistics to measure MediaFLO users' service usage patterns. In addition, the MDS 230 can share data and information with the MTMS 240.

The MTMS 240 can be implemented to receive content from one or more content providers 235. The content can include real-time, non-real-time and IP data services content. The MTMS 240 can aggregate the received content and can change the content into a format supported by one or more mobile devices. In some implementations, the MTMS 240 can encode the content received from the one or more content providers 235. For example, real-time, non-real-time and IP data services content can be aggregated and transcoded at the MTMS 240 for delivery to the MediaFLO device 280. The MTMS 240 also can multiplex the received content before delivering encoded and multiplexed content to a distribution network 250. In some implementations, a multiplexer component of the MTMS 240 can aggregate the received content and alter the content into a MediaFLO supported format. Additionally, in some implementations, the multiplexer component can include a statistical multiplexer (Stat-MUX) that can be configured to change the bit rate of services according to the needs of different channels at different times. In statistical multiplexing, a communication channel can be divided into an arbitrary number of variable bit rate digital channels or data streams. The Stat-MUX can employ a more complex method of managing change in input channel bit rates which can result in a better utilization of bandwidth. For example, using the Stat-MUX, a MediaFLO network 205 operator can decrease the bit rate for generally static channel programming, like a news cast, while increasing the bit rate for more dynamic channel programming, like a basketball game. The MTMS 240 also can be implemented to encrypt content, in addition to determining resource allocation and distribution of content. Moreover, the MTMS 240 can communicate with one or more third-party CAS 245. In addition, the MTMS 240 can transmit data and information through the distribution network 250 to the FLO transmitter 260.

The distribution network 250 can receive encoded content from the MTMS 240 and can distribute the content to the one or more FLO transmitters 260. The FLO transmitter 260 can receive encoded content from the MTMS 240 over the distribution network 250. The encoded content can include content belonging to a wide-area operational infrastructure (WOI) and a local-area operational infrastructure (LOI). Generally, the WOI content is associated with a wide-area broadcast signal that will be transmitted over a larger broadcast area than the LOI content, which is associated with a local-area broadcast signal. For example, the WOI content may be national news, and the LOI content may be regional or local news. The WOI and LOI content can be received by the FLO transmitter 260 in distinct WOI and LOI signals, or in one or more combined signals. The FLO transmitter 260 can be implemented to transmit the WOI content, the LOI content, or both, as a mobile broadcast signal to one or more mobile devices. The FLO transmitter 260 can supply the content to MediaFLO-enabled mobile devices by transmitting a FLO waveform. For example, the FLO transmitter 260 can transmit a FLO waveform including the WOI and LOI content to the MediaFLO device 280.

In some implementations, the FLO transmitter 260 also can transmit content particular to a specific venue, or micro-venue. The content particular to the specific venue or micro-venue can be received from the MTMS 240 over the distribution network 250. Venues can include, e.g., sporting arenas, concert halls, movie theatres, shopping malls, or other such event locations. For example, the FLO transmitter 260 can transmit player statistics associated with a baseball game to MediaFLO-enabled mobile devices residing within the confines, or surrounding area, of a baseball stadium. Micro-venues can include, e.g., office buildings, automobiles or other mobile objects, restaurants, shopping mall department stores or kiosks, or other more localized event locations. For example, the FLO transmitter 260 can transmit sale-related data to users operating MediaFLO-enabled mobile devices within the confines, or surrounding area, of a department store. Additional information related to venue and micro-venue broadcasting can be found in U.S. patent application Ser. No. 12/569,792, filed Sep. 29, 2009, entitled "Apparatus and Methods of Providing and Receiving Venue Level Transmissions and Services," the entire contents of which are incorporated by reference herein.

The FLO transmitter 260 can include an exciter component and a transmitter component. The exciter component can receive ASI MPEG-2 transport streams and can perform proportional-integral-derivative (PID) filtering for the desired multiplex. The exciter component also can generate low power, e.g., less than 1-watt, FLO waveforms for the transmitter input. The transmitter component can generate RF signals that can be received over an air interface by one or more mobile devices. In some implementations, the transmitter can generate and transmit a FLO waveform using orthogonal frequency division multiplexing (OFDM). The transmitter also can be implemented to deliver RF signals to the MediaFLO device 280 via broadcast, multicast and unicast methodologies.

In some implementations, the MTMS 240, the distribution network 250 and the FLO transmitter 260 comprise the FLO RAN subsystem. The FLO RAN subsystem can receive real-time, non-real-time and IP data services content, and can perform audio and video encoding. The FLO RAN subsystem also can multiplex the received content and can distribute the multiplexed data streams. For example, the FLO RAN subsystem can receive real-time content, encode it, and multiplex it with other services, e.g., IP data services or DSvC, before encapsulating and distributing the content to FLO transmitters 260. Additionally, the FLO RAN subsystem can transmit one or more FLO waveforms to one or more mobile devices. For example, the FLO transmitter 260 of the FLO RAN subsystem can transmit one or more FLO signals to the MediaFLO device 280. The MediaFLO device 280 can be implemented to demodulate the FLO RF signal. Users operating the MediaFLO device 280 can navigate through each of the MediaFLO supported services and can access content received at the device. In addition, MediaFLO device 280 users can perform transaction-oriented operations with the MDS 230 over unicast connections through the wireless provider 270.

Figure 3:
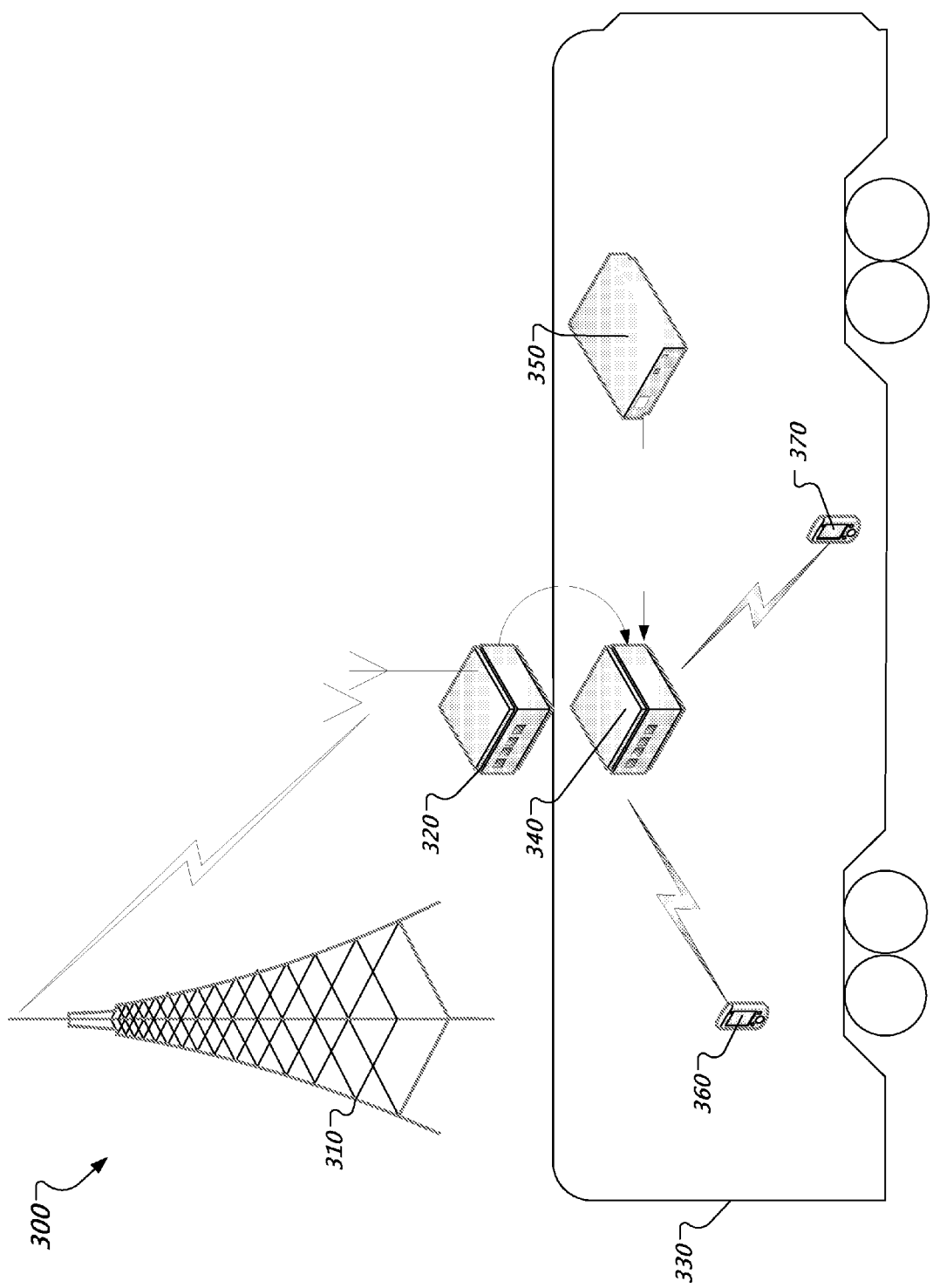
FIG. 3 is an exemplary mobile broadcast communication system.

FIG. 3 is an exemplary mobile broadcast communication system 300. The communication system 300 can, for example, be implemented using the MediaFLO system logical architecture 200 depicted in FIG. 2. For example, a transmitter tower 310 may comprise a FLO transmitter 260, while a mobile device 370 may comprise a FLO-compatible device, such as the MediaFLO device 280. The mobile broadcast communication system 300 can be implemented for venue, and micro-venue, broadcasting. Signals broadcast over the communication system 300 can include discrete-time signals, such as sampled and quantified analog signals, or continuous-time waveform signals representing a bit-stream. For example, the communication system 300 can be implemented to transmit one or more FLO waveforms. The tower 310 transmits signals to remote receivers using one or more routing schemes, such as broadcast, multicast, unicast, or anycast. In some implementations, the tower 310 can transmit streaming media, data services and Internet Protocol television signals using the architecture and networking methods of the Internet Protocol Suite. For example, the tower 310 can multicast audio and video signals to one or more electronic devices, such as a portable communication device. In some other implementations, the tower 310 can transmit data and digital television services through RF broadcasts, satellite signals and cable television formats. The tower 310 can transmit wide-area broadcast signals, or WOI signals, and local-area broadcast signals, or LOI signals. A mobile broadcast signal can comprise a wide area broadcast signal, a local area broadcast signal, or both. Wide area broadcast signals can include WOI content and local area broadcast signals can include LOI content. In some implementations, the tower 310 also can transmit signals containing venue and micro-venue specific content.

The mobile broadcast communication system 300 includes a repeater receiver 320. The repeater receiver 320 can be positioned on a mobile object, such as an automobile, a train, an airplane, or other mobile object. Positioning the repeater receiver 320 on the exterior of a bus 330 can improve the signal reception of the repeater receiver 320. In some implementations, the repeater receiver 320 can be positioned on, or in, a static object, such as a building, a stadium, a shopping mall, a utility pole, or other such structures. The repeater receiver 320 can receive the transmitted signals from the tower 310. The repeater receiver 320 can be coupled to, or in communication with, a repeater 340 positioned to broadcast a signal to mobile devices within the mobile object, e.g., the bus 330, or structure. The repeater 340 can be implemented as a channel capacity adaptive repeater. The channel capacity adaptive repeater can include one or more processing units.

The repeater receiver 320 and the repeater 340 can be connected through a wired or wireless network. For example, the repeater receiver 320 positioned on the roof of the bus 330 and the repeater 340 positioned on the ceiling of the bus 330 can communicate over an 802.11 or a 3G network. In some other implementations, the repeater receiver 320 and the repeater 340 can be co-located in the same device. For example, the repeater receiver 320 and repeater 340 can be included in one device that can be positioned on the roof, or the ceiling, of a mobile object. Alternatively, the device containing the repeater receiver 320 and the repeater 340 can include a remote antenna that can be positioned on the roof of the bus 330 for improving the signal reception of the device.

The repeater receiver 320 can send the received signal to the repeater 340. The repeater 340 can include a transmitter component that can transmit one or more signals to one or more mobile devices, such as a smartphone, cellular phone, personal digital assistant (PDA), interactive game device, notebook, smartbook, netbook, data processing apparatus, or other electronic device. The transmitter component can be implemented to transmit venue, or micro-venue, broadcast signals to mobile devices residing near or within a specific venue or micro-venue. Venue and micro-venue signals transmitted from the repeater 340 can be modulated with a different carrier frequency than the signals received by the repeater receiver 320. For example, after receiving a wide area broadcast signal from the tower 310, the repeater receiver 320 can send the signal to the repeater 340 which can then, through the transmitter component, re-transmit a micro-venue broadcast signal to one or more mobile devices, such as a smartphone 360, or a PDA 370. In some implementations, interference associated with the micro-venue broadcast signal can be reduced due to the proximity of the repeater 340 to the smartphone 360 and PDA 370.

In some implementations, the transmitter component can reside external the repeater 340. The transmitter component can be coupled to, or in communication with, the repeater 340. In some implementations, the transmitter component and the repeater 340 can be connected through a wired or wireless network. For example, the transmitter component and the repeater 340 can communicate over an 802.11 or a 3G network. The transmitter component can be positioned on a mobile object, such as the roof of an automobile, a train, an airplane, or the bus 330. Positioning the transmitter component on, e.g., the roof of the bus 330 can improve the signal transmission. For example, the transmitter component can be implemented as remote antenna that can be positioned on the roof of the bus 330 for improving the micro-venue broadcast signal transmission. In some implementations, the transmitter component can be positioned on, or in, a static object, such as a building, a stadium, a shopping mall, or a utility pole.

The repeater 340 can demodulate the received signal. In some implementations, the repeater 340 can remove one or more data protection layers included with the signal. For example, the repeater 340 can remove redundant overhead data, in addition to redundant payload data included with the signal. In some implementations, the repeater receiver 320 can demodulate the received signal and can remove one or more data protection layers included with the signal before sending the signal to the repeater 340. The repeater 340 can remove protection layers from the received mobile broadcast signal because the repeater 340 transmitter component transmits a micro-venue broadcast signal within a limited transmission area, which presents a lower risk for mobile device reception errors.

One or more processing units in the repeater 340 can receive content from a local content source. The local content source 350 can provide content from within the same environment in which the repeater 340 is located. For example, the repeater 340 can receive local content from a portable electronic device, e.g., a DVD player, operating within the bus 330. Additionally, another exemplary local content source 350 can be a high data rate cellular receiver which can receive additional content from a content provider over a cellular network. The repeater 340 can add the content from the local content source 350 to the mobile broadcast data stream received from the repeater receiver 320 to generate a venue, or micro-venue, broadcast signal. The repeater's 340 processing units, and transmitter component, can be implemented to add the local content into the data stream in vacancies created when the repeater 340 removed, or reduced, the redundant bits included with the mobile broadcast data stream. The repeater 340 transmitter component can transmit a micro-venue broadcast data stream, that includes content from the mobile broadcast data stream, in addition to the added local content, to one or more mobile devices, such as the smartphone 360, the PDA 370, or other such portable communication devices operating within a venue, or micro-venue. In some implementations, the transmitter component can re-transmit the mobile broadcast data stream received from the repeater receiver 320 without adding the local content received from the local content source 350.

Figure 4A:
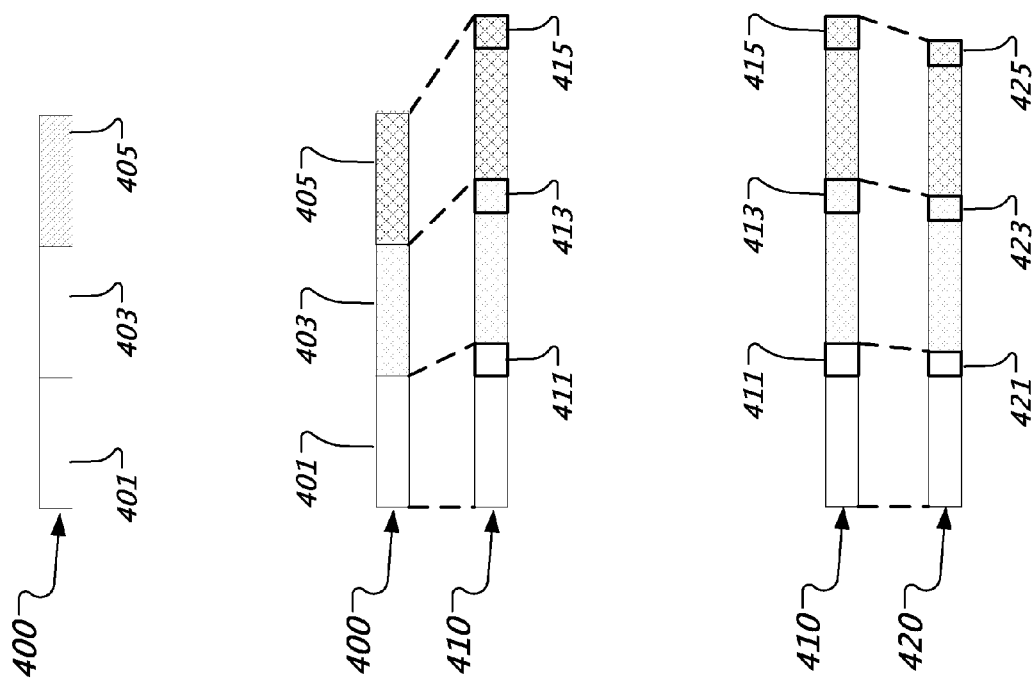
FIG. 4A shows exemplary broadcast data streams.

FIG. 4A shows exemplary broadcast data streams 400, 410 and 420. The broadcast data streams 400, 410 and 420 can be received by a repeater, like the channel capacity adaptive repeater 340 depicted in FIG. 3. Broadcast data stream 400 includes information packets 401, 403 and 405. The information packets 401, 403 and 405, or payload, can represent, for example, a data packet, a TV channel packet, or other communication packet transmitted over a wireless network. In MediaFLO systems, the information packets, 401, 403 and 405 are known as medium access control (MAC) packets. Overhead data, or outer code data, such as Reed-Solomon Parity data, can be associated with the information packets 401, 403 and 405. The outer code data can include information to organize the information packets 401, 403 and 405 in, e.g., a transmitter before being transmitted. For example, the outer code information can include the order in which each information packet 401, 403 and 405 is to be transmitted according to the broadcasting standard applicable for the transmission. In some implementations, the overhead data can be added to the information packets 401, 403 and 405.

Broadcast data stream 410 includes outer code data blocks 411, 413 and 415 in addition to the information packets 401, 403 and 405 from broadcast data stream 400. Outer code data block 411 is associated with information packet 401; outer code data block 413 is associated with information packet 403; and outer code data block 415 is associated with information packet 405. In MediaFLO systems, the data components resulting from the addition of the respective outer code data block to the respective information packet are known as multicast logical channels (MLC). MLCs can include MAC packets and outer code data, for example, Reed-Solomon Parity data. In some implementations, the outer code data blocks 411, 413 and 415 can be used for error detection during digital transmissions. For example, the outer code data blocks 411, 413 and 415 can include information related to detecting errors in the digital transmission by counting the number of "1" bits, or alternatively, the number of "0" bits in the data stream.

In some implementations, the outer code data blocks 411, 413 and 415 can contain redundant data. Redundant data can include bits of data that are similar, or identical, and found in multiple places, such as within the outer code blocks 411, 413 and 415. Alternatively, redundant data can include bits of data that are similar, or identical, and found in multiple places, such as within the information packets 401, 403 and 405. For example, data included in both the outer code data blocks 411, 413 and 415 and in the information packets 401, 403 and 405 can be considered redundant data. Redundant data bits can be associated with error detection and correction during data stream transmission. The inclusion of redundant outer code data, or information, in the outer code data blocks 411, 413 and 415 can result in inefficient data transmission, i.e., a reduction in the actual, or effective, data rate in the communication system. In MediaFLO systems, the size of the MLC data structure cannot be altered. Because the MLC has a finite size, the inclusion of a large amount of redundant data in the MLC can result in the exclusion of more valuable data, such as payload data, in the MLC. The exclusion of valuable payload data in each MLC can burden the communication system by requiring a greater number of MLC data structures to carry the requisite payload. Transmitting additional MLC data structures increases the total transmission time and can result in an inefficient data rate.

In some implementations, the information contained in outer code data blocks 411, 413 and 415 can be reduced before transmission of the broadcast data stream 410. One or more encoding, or decoding, schemes can be used to reduce the information contained in the outer code data blocks 411, 413 and 415. For example, redundant data bits contained in outer code data blocks 411, 413 and 415 can be reduced by a Reed-Solomon Parity data encoding scheme. By reducing the amount of overhead information contained in outer code data blocks 411, 413 and 415, the broadcast data stream 410 can be transmitted in a shorter period of time. For example, broadcast data stream 420, which includes reduced outer code data blocks 421, 423 and 425 corresponding to redundant outer code data blocks 411, 413 and 415, respectively, contains less information than broadcast data stream 410. Because broadcast data stream 420 contains less data than broadcast data stream 410, it can be transmitted faster, and as a corollary, can be processed faster.

The encoding, or decoding, schemes can be configured to generate various amounts of overhead data. In MediaFLO, Advanced Television Systems Committee (ATSC) and digital video broadcasting-handheld (DVB-H) standards, the ratio between overhead data and overall data is configurable. For example, MediaFLO systems can be implemented to support the following ratios of valuable data to overall data for outer code: 1/2, 3/4, 7/8 and 1. In some implementations, the ratios for outer code can be used for inner code encoding, and vice versa. Depending on the applicable broadcast transmission standards, the effective transmission data rate can be increased by 100 percent. For example, because the amount of overhead data can equal up to one half the total amount of data encoded in a MediaFLO system transmission, by configuring the encoding scheme to eliminate all overhead data, the valuable data rate can be doubled. Thus, in some implementations, reducing, or eliminating, all of the redundant data included in the outer code information can increase the throughput gain two-fold. Thus, the effective data rate for the broadcast data stream 420 will be twice as fast as the effective data rate for the broadcast data stream 410.

Figure 4B:
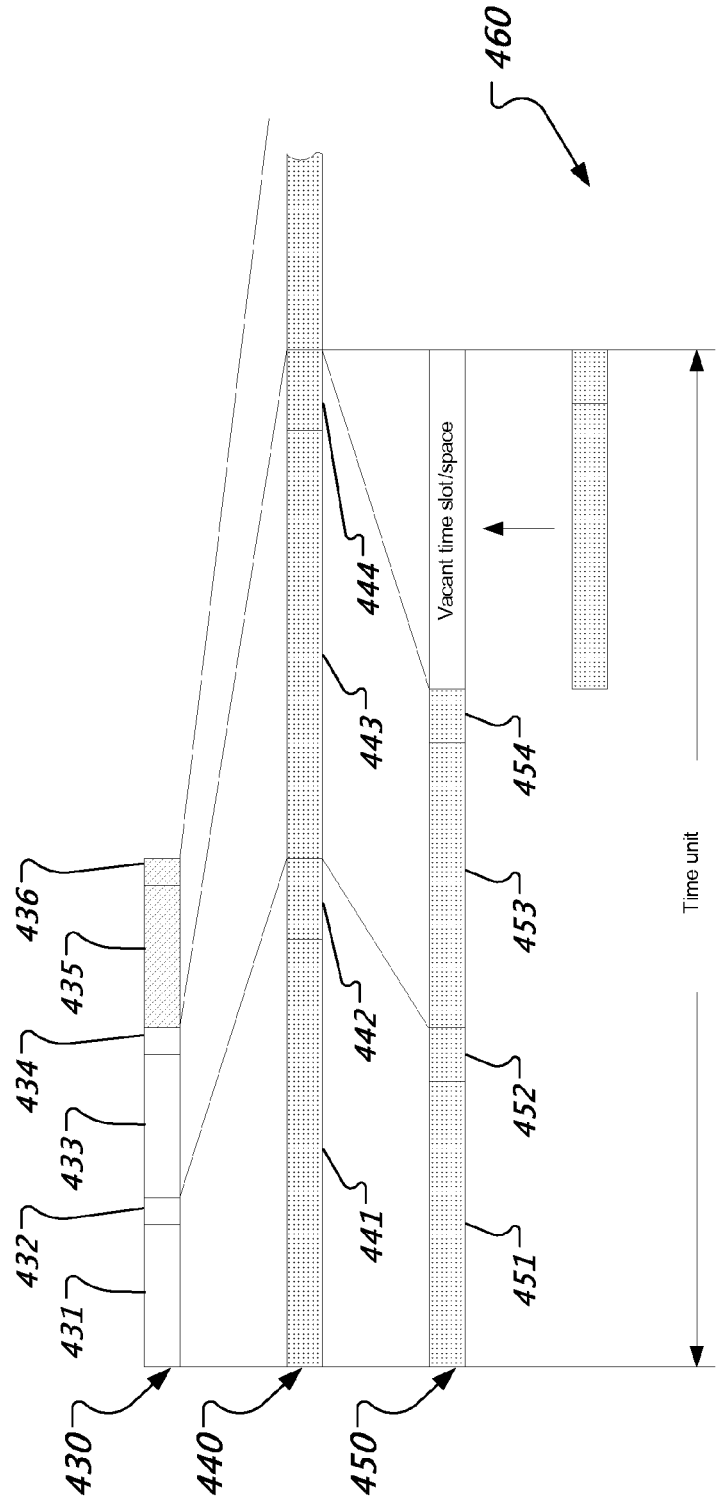
FIG. 4B shows exemplary broadcast data streams including inner and outer code information.

FIG. 4B shows exemplary broadcast data streams 430, 440 and 450 including inner and outer code information. Outer code information can be associated with overhead data, whereas inner code information can be associated with both the data included in the payload, i.e., the information, or MAC, packets, and the overhead data, i.e., the parity data. Broadcast data stream 430 includes information packets 431, 433 and 435, and associated outer code data blocks 432, 434 and 436, respectively. The information packets 431, 433 and 435 can be encoded with inner code information. In some implementations, the outer code data blocks 432, 434 and 436 also can be encoded with inner code information. Redundant data can be included in the inner code information associated with information packets 431, 433 and 435, and the outer code data blocks 432, 434 and 436. The inclusion of redundant inner code data, or information, in the information packets 431, 433 and 435 and in the outer code data blocks 432, 434 and 436 can result in inefficient data transmission, i.e., a reduction in the actual, or effective, data rate in the communication system.

The broadcast data stream 440 shows the result of encoding information packets 431 and 433, and outer code data blocks 432 and 434, with inner code information. The broadcast data stream 440 resulting from the inclusion of inner code information includes information packets 441 and 443, and outer code data blocks 442 and 444, respectively. In MediaFLO systems, the data components resulting from the addition of a respective outer code block to a respective information packet after encoding with inner code information are known as turbo encoder packets (TEP). Turbo encoding can generate redundant bits of data that are spread among the valuable payload data, and the less valuable parity data. Thus, TEPs 441/442 and 443/444 can include a second layer of redundant data protection. The redundant data protection can be implemented to ensure that particular data bits are transmitted and received properly.

The redundant data bits included in the broadcast data stream 440 can include redundant payload information and redundant parity information. The turbo encoder can include redundant data bits based on a ratio that depends on the applicable transmission standard. MediaFLO systems also can be implemented to support the following ratios of redundant data to overall data for inner code: 1/5, 1/3, 1/2 and 2/3. For example, a MediaFLO system standard ratio can include encoding two redundant bits for every one valuable data bit, which results in a code rate of 1/3, indicating strong data protection. In another example, a MediaFLO system standard ratio can include encoding one redundant bit for every two valuable data bits, which results in a code rate of 2/3, indicating weaker data protection. In some implementations, such as in MediaFLO systems, the code rate can be decreased from 1/3 to 2/3 by reducing the number of redundant bits the turbo encoder includes in the broadcast data stream 440, e.g., from 2 redundant bits (1 valuable data bit) to 1 redundant bit (2 valuable data bits) out of 3 total bits. Decreasing the code rate can result in weaker data protection, but can also result in including fewer redundant data bits in the broadcast data stream, and, like the example above, can double the valuable bit rate.

Broadcast data stream 450 depicts a data stream containing fewer redundant data bits than the broadcast data stream 440. The TEPs 451/452 and 453/454 have been encoded by the turbo encoder at a slower code rate than TEPs 441/442 and 443/444, respectively. Reducing, or eliminating, all of the redundant data included in the inner code information can increase the throughput gain two-fold. Thus, the effective data rate for the broadcast data stream 450 can be twice as fast as the effective data rate for the broadcast data stream 440. Because the reduction of outer code information and inner code information are not mutually exclusive, in some implementations, such as in MediaFLO systems, by reducing the outer code and inner code information, the throughput gain can be increased four-fold. The reduction, or elimination, of the redundant data bits generates vacant space within the broadcast data stream 450. The vacant space can be filled with new content 460. In some implementations, the new content 460 can include local content from the local content source 350 depicted in FIG. 3.

Figure 5:
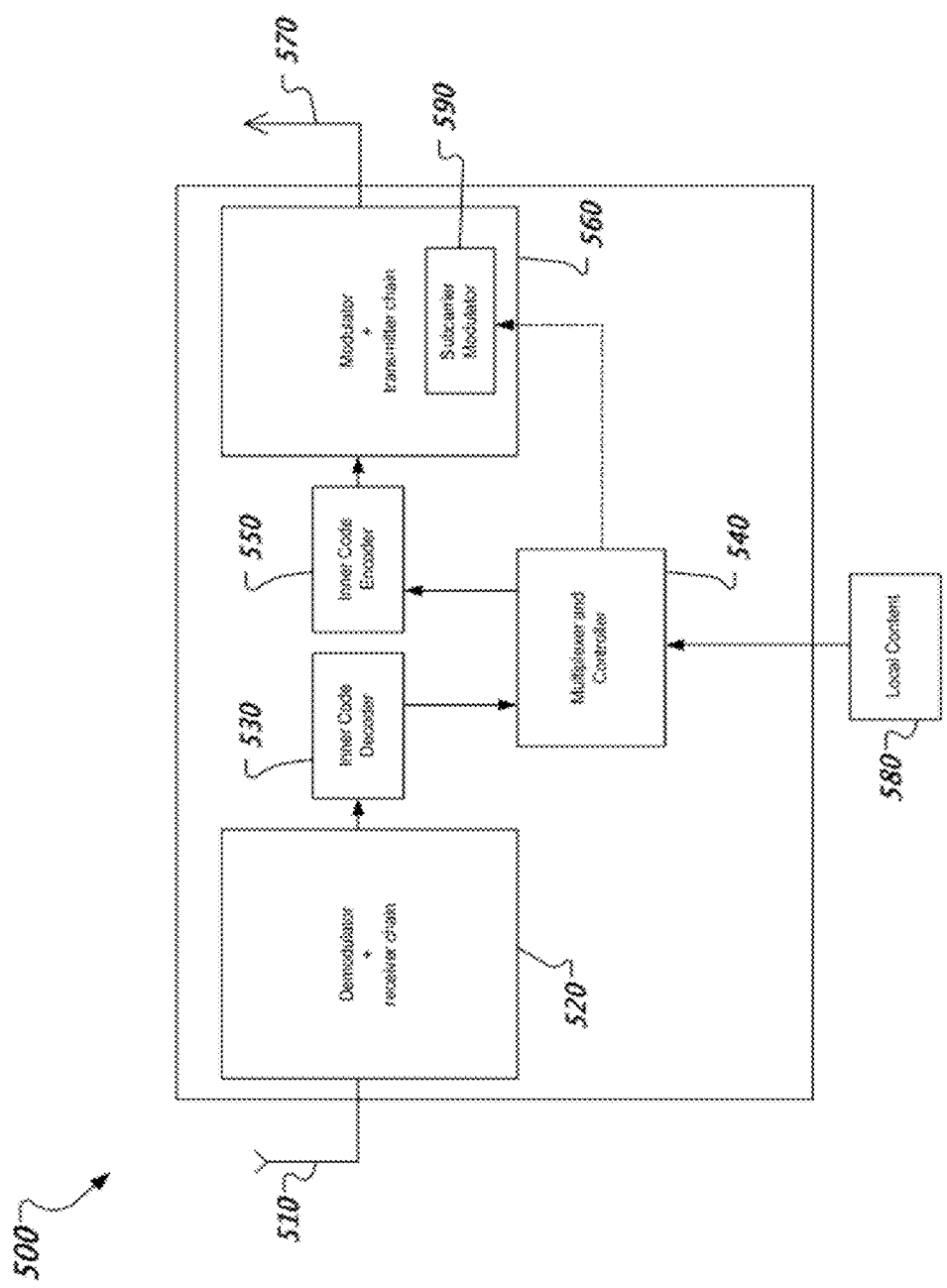
FIG. 5 shows an exemplary channel capacity adaptive repeater circuit.

FIG. 5 shows an exemplary channel capacity adaptive repeater circuit 500. The repeater circuit 500 can reside within the repeater 340 depicted in FIG. 3. Additionally, one or more components of the repeater circuit 500 can reside within the repeater receiver 320 depicted in FIG. 3. In some implementations, the repeater circuit 500 can be configured as an electronic device operating in accordance with a software program. For example, the repeater circuit 500 can be implemented in hardware and programmed to run a repeater program. Generally, the repeater circuit 500 is configured by software to receive a signal and re-transmit the signal at a higher frequency level, higher amplitude, a different phase, a different modulation, a different code rate or a combination of any of the above. In some implementations, the repeater circuit 500 can be configured to receive a mobile broadcast signal and re-transmit an adjusted mobile broadcast signal at a lower frequency level and lower amplitude. The repeater circuit 500 can include one or more circuit components, such as a receiver 510, a demodulator 520, a decoder 530, a multiplexer 540, an encoder 550, a modulator 560, a subcarrier modulator 590 and a transmitter 570. The repeater circuit 500 components 510-570 and 590 can communicate directly, and indirectly, with one another. In some implementations, the repeater circuit 500 components 510-570 and 590 can reside within the repeater circuit 500, yet in other implementations, the components 510-570 and 590 can be located external the repeater circuit 500. Each of the repeater circuit 500 components 510-570 and 590 can process one or more broadcast signals, or data streams.

The receiver 510 receives a mobile broadcast signal, for example, a broadcast signal in accordance with the FLO standard by a FLO transmitter, as described with respect to FIGS. 1-3. The signal can include real-time content, Internet Protocol data services content, and non-real-time content. The receiver 510 can be any application, module or device, configured by software to receive an RF signal. The receiver 510 passes the received signal to a demodulator 520 that demodulates the received signal.

The demodulator 520 can be implemented as an electronic device and configured to operate by a software program. For example, the demodulator 520 can be implemented in hardware and programmed to run a demodulator program that can recover the information content from a modulated carrier wave. In some implementations, the demodulator 520 can be any application, module or device, configured by software to, e.g., extract an original information-bearing signal from a modulated carrier wave. The demodulator 520 can demodulate the underlying data within the received signal and also can remove one or more of the redundant protection layers, e.g., redundant inner and outer code information, associated with the signal. The demodulator 520 passes the demodulated signal to a decoder 530.

The decoder 530 decodes the demodulated signal. The decoder 530 can be implemented as an electronic device and configured to operate by a software program. For example, the decoder 530 can be implemented in hardware and programmed to convert data, such as a telecommunication or broadcast television signal, from its transmitted form into a form interpretable to other electronic devices. In some implementations, the decoder 530 comprises modules or devices, configured by software to convert data from its transmitted form into a form interpretable to other devices. The decoder 530 can be implemented to decode the demodulated signal to obtain original information. For example, the decoder 530, or inner code decoder, can decode digital broadcast data streams to obtain the underlying information packets and parity data. The decoder 530 also can strip redundant bits of data, or information, from a signal. The removal of the redundant bits of information can generate vacant space in the signal. In some implementations, the decoded digital broadcast data streams can be stored in a storage device, located within, or coupled to, the repeater circuit 500. The decoder 530 passes the decoded signal to the multiplexer 540.

The multiplexer 540 multiplexes one or more decoded signals. The multiplexer 540 can be implemented as an electronic device and configured to operate by a software program. For example, the multiplexer 540 can be implemented in hardware and programmed to combine one or more input signals, such as video data received from a FLO transmitter, and audio data received from a local content source, into one output signal. In some implementations, the multiplexer 540 can be any module or device, configured by software to combine analog and digital data streams into an output signal that can carry several communication channels. For example, the multiplexer 540 can be implemented as a Stat-MUX capable of combining several variable bit rate data streams into one constant bandwidth signal.

In some implementations, the multiplexer 540 can add content to the signal in vacant data space within the signal. For example, the multiplexer 540 can include additional content from a local content source 580 in data space vacated by the reduction of redundant data bits in the signal. In some implementations, the multiplexer 540 can obtain the additional content from a local storage device or local memory cache within, or connected to, the local content source 580. In some other implementations, the multiplexer 540 can obtain on-board content associated with the local static environment, such as a venue or micro-venue. For example, the multiplexer 540 can obtain content from an airplane's on-board entertainment system. The multiplexer 540 can pass the multiplexed signal to an encoder 550. In some implementations, the multiplexer 540 can include a controller. The controller can determine which signals to combine in the multiplexer 540. In some implementations, the controller can manipulate the overhead protection, or amount of redundant bits, in a data stream. The controller also can determine the amount of additional content that can be multiplexed with the decoded signal. In some implementations, the controller 540 can set the modulation scheme for one or more of the data stream subcarriers.

The encoder 550 receives the multiplexed signal from the multiplexer 540. The encoder 550, or inner code encoder, can encode the multiplexed signal. Keeping with the example of a FLO-based system, the encoder 550 can be implemented as a MediaFLO turbo encoder. The turbo encoder can encode the multiplexed signal with a variable code rate. Encoding at a high code rate, i.e., two redundant bits for every payload data bit, can result in large quantities of redundant bits in the signal. Encoding at a low code rate, i.e., one redundant bit for every two payload data bits, can result in smaller quantities of redundant bits in the signal. The encoder 550 can be implemented to generate fewer redundancy bits. In some implementations, however, the encoder 550 can include the same, or a greater amount of redundancy bits than those included in the received signal. The encoder 550 can be implemented to re-encode at least a portion of all the MAC packets and parity data included in a broadcast data stream. By re-encoding the MAC packets and parity data with a weaker code rate, fewer redundancy bits will be included in the TEPs.

The encoder 550 can be implemented as an electronic device and configured to operate by a software program. For example, the encoder 550 can be implemented in hardware and programmed to convert data from its received form into a form interpretable to other devices. In some implementations, the encoder 550 can be any module or device, configured by software to convert data from its received form into a form interpretable to other devices. The encoder 550 also can be implemented to compress data during encoding for transmission. In some implementations, the decoder 530 and the encoder 550 can be implemented as a transcoder for direct digital-to-digital conversion of one encoding to another. The encoder 550 can pass the encoded signal to a modulator 560.

The modulator 560 receives and modulates the encoded signal. The modulator 560 can be implemented as an electronic device and configured to operate by a software program. For example, the modulator 560 can be implemented in hardware and programmed to vary a waveform in relation to another waveform. In some implementations, the modulator 560 can be any module or device, configured by software to, e.g., vary a waveform by using a carrier signal to convey a lower frequency signal. For example, the modulator 560 can modify one or more of the amplitude, phase and frequency of a high-frequency sinusoidal waveform used as a carrier signal to convey an analog baseband signal or digital bit stream.

In some implementations, the modulator 560 can be implemented as a radio frequency modulator that can receive an encoded multiplexed signal and output a radio frequency-modulated signal. For example, the modulator 560 can use an ultra high frequency (UHF) signal to convey the encoded multiplexed signal. Alternatively, the modulator 560 can use a very high frequency (VHF) signal to convey the local area broadcast signal. In some other implementations, the modulator 560 can use an industrial, scientific and medical (ISM) radio band signal, such as the 2400 MHz band, to convey the encoded multiplexed signal. The modulator 560 can also use other ISM radio bands, such as the 433.05-434.79 MHz, 902-928 MHz and above 61 GHz radio bands. In some implementations, the modulator 560 can alter the frequency of a local area broadcast signal. For example, the modulator 560 can modulate a local area broadcast signal to a higher frequency than that of a wide area broadcast signal. The modulator 560 can transmit the modulated signal to a transmitter 570.

The modulator 560 also can include a subcarrier modulator 590. The subcarrier modulator 590 can communicate directly and indirectly with the modulator 560. The subcarrier modulator 590 can be implemented as an electronic device and configured to operate by a software program. For example, the subcarrier modulator 590 can be implemented in hardware and programmed to carry a separate signal for modulation into another signal. In some implementations, the subcarrier modulator 590 can be any module or device, configured by software that can carry a separate signal for modulation into another signal of, e.g., higher frequency and bandwidth. The subcarrier modulator 590 can be implemented to change the modulation scheme of the processed signal. The subcarrier modulator 590 can set the modulation scheme of the processed signal to be the same as, or different from the signal received by the receiver 510 and the demodulator 520. By changing the modulation scheme, the subcarrier modulator 590 can include a greater number, or a lesser number of data bits per subcarrier and per time unit, than the received signal. In some implementations, a network operator, or automated controller, can instruct the subcarrier modulator 590 to change the modulation scheme to a subcarrier that supports more data bits, or a higher data bit rate.

In some implementations, changing the subcarrier modulation scheme can result in increasing the effective data rate of the broadcast signal. Simple subcarrier modulation schemes, such as quadrature phase-shift keying (QPSK), are less susceptible to signal noise and interference, but have smaller data bit carrying capacities. More complicated subcarrier modulation schemes, such as quadrature amplitude modulation (QAM), are more susceptible to signal noise and interference, but have larger data bit carrying capacities. Depending on the modulation allowed in the broadcast transmission standard, the subcarrier modulator 590 can be implemented to switch to a subcarrier modulation scheme supporting a higher bit rate. In some implementations, the subcarrier modulator 590 can switch from any supported modulation scheme to any other supported modulation scheme. For example, when the broadcast transmission standard permits both single carrier and multicarrier modulation schemes, with multiple supported modulations for the single carrier and each of the multicarrier modulation subcarriers, the subcarrier modulator 590 can select the modulation scheme that supports the larger number of bits, or higher bit rate. Exemplary subcarrier modulation schemes can include DPSK, BPSK, QPSK, 16-QAM and 64-QAM. Thus, the subcarrier modulator 590 can be implemented to switch from a QPSK subcarrier modulation scheme to a 16-QAM subcarrier modulation scheme.

Switching to a more complicated subcarrier modulation scheme can result in increased signal noise and interference on radio channel conditions. To compensate for the increased signal noise and interference, the channel capacity adaptive repeater circuit 500 can be implemented to transmit a signal, such as a venue, or micro-venue signal, only within a configurable and predefined local area, e.g., the venue or micro-venue, or within a 10 m, 100 m, 1 km, or 10 km radius from the channel capacity adaptive repeater circuit 500. For example, depending on the transmission capacity, the channel capacity adaptive repeater 500 can transmit a local area broadcast signal solely within the confines and surrounding areas of, e.g., a football stadium, a shopping mall, an office building, an amusement park, an auditorium, a mobile object, such as a railroad passenger car, or other such venue and micro-venue environments.

In some implementations, the subcarrier modulator 590 can modify, or change, the modulation scheme to one supporting a lower bit rate. For example, the subcarrier modulator 590 also can switch from a 16-QAM subcarrier modulation scheme to a QPSK subcarrier modulation scheme. In some implementations, to compensate for the lower capacity modulation scheme, the subcarrier modulator 590, or the modulator 560, can modify the amount of information included in the inner code, the outer code, or both. The subcarrier modulator 590 also can change the formation of the subcarrier modulation scheme's allocation and timing from one mode to another according to transmission standard limitations. For example, in integrated services digital broadcasting-terrestrial (ISDB-T), the subcarrier modulator 590 can change the channel mode from, e.g., 2 to 3 and vice versa. Similarly, in DVB-H, the subcarrier modulator 590 can switch between one or more broadcast transmission modes, such as 2K, 4K and 8K.

Because the 16-QAM subcarrier modulation scheme can hold twice the number of data bits than the QPSK subcarrier modulation scheme, when the subcarrier modulator 590 switches from the QPSK subcarrier modulation scheme to the 16-QAM subcarrier modulation scheme, the effective data rate can increase two-fold. Moreover, because the reduction of outer code and inner code information, and changing the modulation scheme to support a higher bit rate are not mutually exclusive, by reducing both the outer code and inner code information, and switching the subcarrier modulation to support a larger number of bits, the throughput gain can be increased eight-fold. In some implementations, increasing the throughput gain, e.g., eight-fold can result in generating a signal highly susceptible to signal noise and interference. To maintain signal integrity, the generated signal can be transmitted in a confined or static area. In some implementations, the subcarrier modulator 590 can alter the frequency of a local area, venue or micro-venue broadcast signal. For example, the subcarrier modulator 590 can modulate a local area digital broadcast signal to a higher frequency than that of a wide area, or mobile broadcast signal.

The transmitter 570 can obtain the modulated signal from the modulator 560, or subcarrier modulator 590. The transmitter 570 can be implemented as an electronic device, such as a transmission plug-in board capable of transmitting a FLO signal, that can propagate an electromagnetic signal, such as radio, television, FLO waveform, or other telecommunications signals. In some implementations, the transmitter 570 can be coupled to an antenna. In some other implementations, the transmitter 570 can be any application, module or device, configured by software to, e.g., propagate an electromagnetic signal. The transmitter 570 can transmit the encoded modulated signal over a physical point-to-point or point-to-multipoint transmission medium, such as the wireless communication system described with respect to FIG. 1. The transmitter 570 can transmit the encoded modulated signal to one or more communication devices, such as the MediaFLO-enabled devices depicted in FIGS. 1-2.

In some implementations, the repeater circuit 500 can receive instructions from a mobile broadcast network operator or content provider. The repeater circuit 500 can process the instructions and, for example, instruct the decoder 530, or encoder 550, to increase the effective data bit rate by reducing the redundancy bits in the signal. Additionally, the repeater circuit 500 can instruct the modulator 560, or subcarrier modulator 590, to switch to a subcarrier modulation scheme supporting a higher bit rate.

Figure 6:
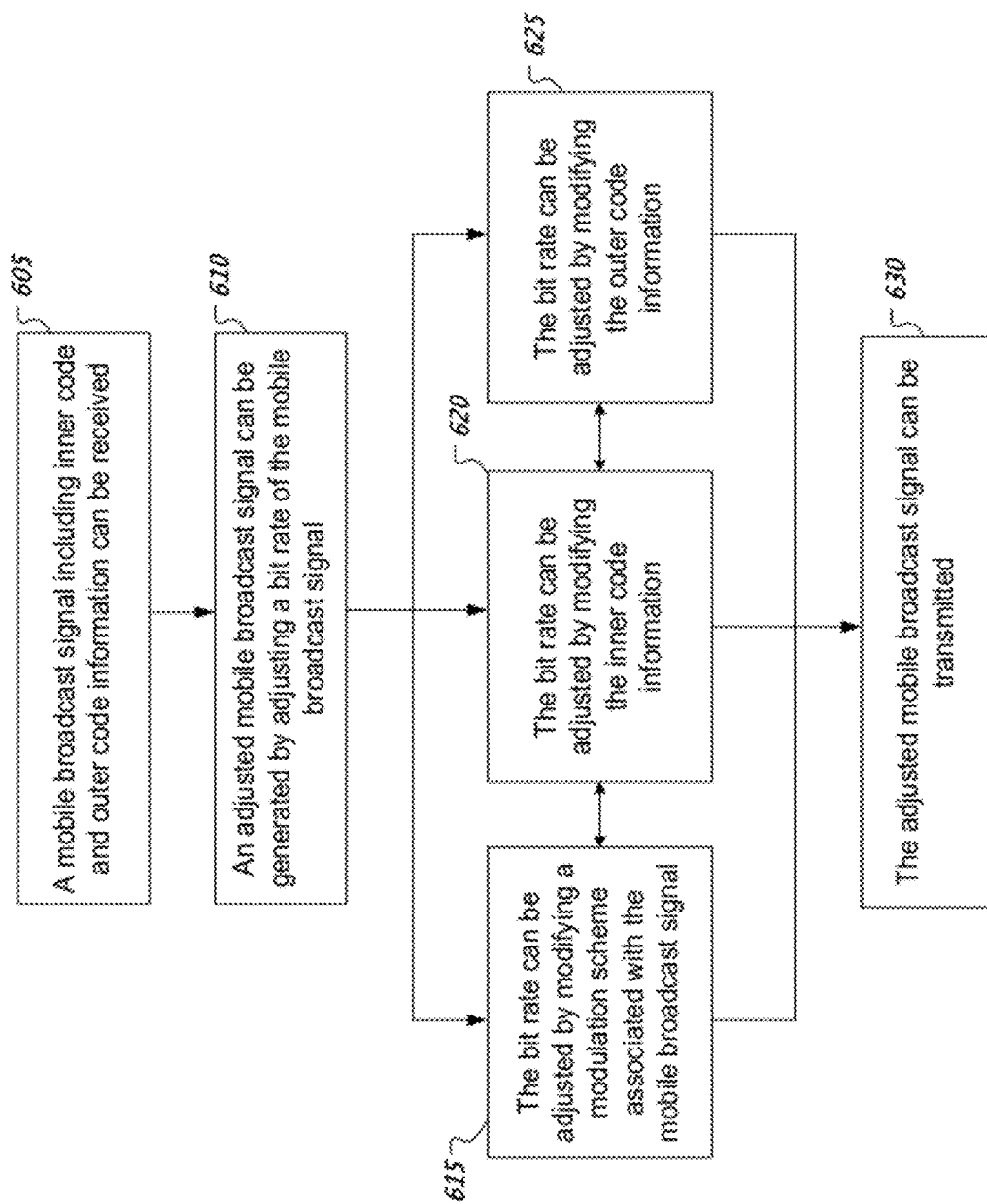
FIG. 6 shows a flowchart of an exemplary process for increasing data rate in a digital signal.

FIG. 6 shows a flowchart of an exemplary process 600 for adjusting data rate in a digital signal. The process 600 can, for example, be implemented in the mobile broadcast communication system 300 depicted in FIG. 3 and the channel capacity adaptive repeater circuit 500 depicted in FIG. 5.

A mobile broadcast signal including inner code and outer code information can be received (605). The mobile broadcast signal can be received by a channel capacity adaptive repeater. The mobile broadcast signal can be transmitted by one or more broadcast towers. For example, the mobile broadcast signal can be transmitted by one or more FLO transmitters. The inner code information can include data associated with the payload. In some implementations, the inner code information can include data associated with overhead protection. The outer code information can include data associated with the overhead protection, such as Reed-Solomon Parity data. The mobile broadcast signal can include at least one of: a WOI signal, and a LOI signal. The WOI and LOI signals can include WOI and LOI content, respectively.

An adjusted mobile broadcast signal can be generated by adjusting a bit rate of the mobile broadcast signal (610). The channel capacity adaptive repeater can generate the adjusted mobile broadcast signal by adjusting the bit rate of the mobile broadcast signal. The bit rate can be adjusted through modification or manipulation of at least one of these parameters: a modulation scheme associated with the mobile broadcast signal, the inner code information, and the outer code information. For example, one or more processors in the channel capacity adaptive repeater can change the modulation scheme of the mobile broadcast signal. Additionally, an encoder, such as a turbo encoder, in the channel capacity adaptive repeater can change an amount of redundant inner code data bits included in the inner code information. Moreover, the encoder, or other processing unit, such as a decoder or transcoder, can change an amount of redundant outer code data bits included in the outer code information. The modification, or manipulation, of at least one of the parameters, can increase the bit rate of the mobile broadcast signal. In some implementations, to increase the bit rate of the wide are broadcast, the channel capacity adaptive repeater can decrease the amount of redundant inner code data bits included in the inner code information, while increasing the amount of redundant outer code data bits included in the outer code information, and vice versa. The adjusted mobile broadcast signal can be multiplexed with additional content. For example, the adjusted mobile broadcast signal can be multiplexed with content derived from a local content source. The multiplexed local content can be inserted in bit space vacated by the modification of the inner code information, the outer code information, or both. Because the channel capacity adaptive repeater can be implemented to generate the adjusted mobile broadcast signal for transmission only within a local area, such as a venue or micro-venue, the protection layers associated with the transmission of the mobile broadcast signal can be reduced or removed.

The bit rate can be adjusted by modifying a modulation scheme associated with the mobile broadcast signal (615). A modulator residing within the channel capacity adaptive repeater can modulate the mobile broadcast signal by varying one or more parameters associated with the mobile broadcast signal. The parameters can include amplitude, phase and frequency. Additionally, a subcarrier modulator can modulate the mobile broadcast signal. The modulator and subcarrier modulator can modify the modulation scheme associated with the mobile broadcast signal by switching to a subcarrier modulation scheme supporting a higher bit rate, or a subcarrier modulation scheme capable of containing a greater number of data bits. Exemplary subcarrier modulation schemes can include DPSK, BPSK, QPSK, 16-QAM and 64-QAM. In some implementations, the subcarrier modulator can switch from a subcarrier modulation supporting a lower bit rate, such as a QPSK subcarrier modulation scheme, to a subcarrier modulation supporting a higher bit rate, such as a 16-QAM subcarrier modulation scheme. Alternatively, the subcarrier modulator also can switch from a 16-QAM subcarrier modulation scheme to a QPSK modulation scheme. The subcarrier modulator can be implemented to change the modulation scheme associated with the mobile broadcast signal from any supported modulation scheme to any other supported modulation scheme.

The bit rate can be adjusted by modifying the inner code information (620). An encoder residing within the channel capacity adaptive repeater can modify or manipulate the inner code information in the mobile broadcast signal. For example, a turbo encoder can modify the inner code information by increasing a ratio of data bits to the total number of bits being transmitted. The turbo encoder can increase the ratio of data bits to the total number of data bits being transmitted by reducing the amount of redundant inner code bits. In some implementations, the encoder can reduce the ratio of data bits to the total number of bits by increasing the ratio of inner code bits to the total bits transmitted. In some other implementations, the inner code information can be modified by decreasing a ratio of redundant bits to the total number of bits transmitted.

The bit rate can be adjusted by modifying the outer code information (625). An encoder residing within the channel capacity adaptive repeater can modify or manipulate the outer code information in the mobile broadcast signal. For example, a Reed-Solomon encoder can modify the outer code information by increasing a ratio of data bits to the total number of bits being transmitted. The Reed-Solomon encoder can increase the ratio of data bits to the total number of bits being transmitted by reducing the amount of redundant outer code bits. In some implementations, the encoder can reduce the ratio of data bits to total number of bits by increasing the ratio of outer code bits to the total bits transmitted. In some other implementations, the outer code information can be modified by decreasing a ratio of redundant bits to the total bits transmitted.

The adjusted mobile broadcast signal can be transmitted (630). The adjusted mobile broadcast signal can be transmitted by a transmitter residing within, or coupled to the channel capacity adaptive repeater. The adjusted mobile broadcast signal can be received by one or more mobile devices. The adjusted mobile broadcast signal can be transmitted in a different frequency than a frequency corresponding to the received mobile broadcast signal. For example, the adjusted mobile broadcast signal can be transmitted at a high frequency than the mobile broadcast signal frequency. In some implementations, the adjusted mobile broadcast signal can be transmitted with a different altitude, phase, modulation, and code rate, than a mobile broadcast signal. The adjusted mobile broadcast signal can be transmitted within an area smaller than an area associated with the received mobile broadcast signal. For example, the adjusted mobile broadcast signal can be transmitted within a venue or micro-venue having a smaller mobile device reception area than the area associated with reception of the mobile broadcast signal.

Figure 7:
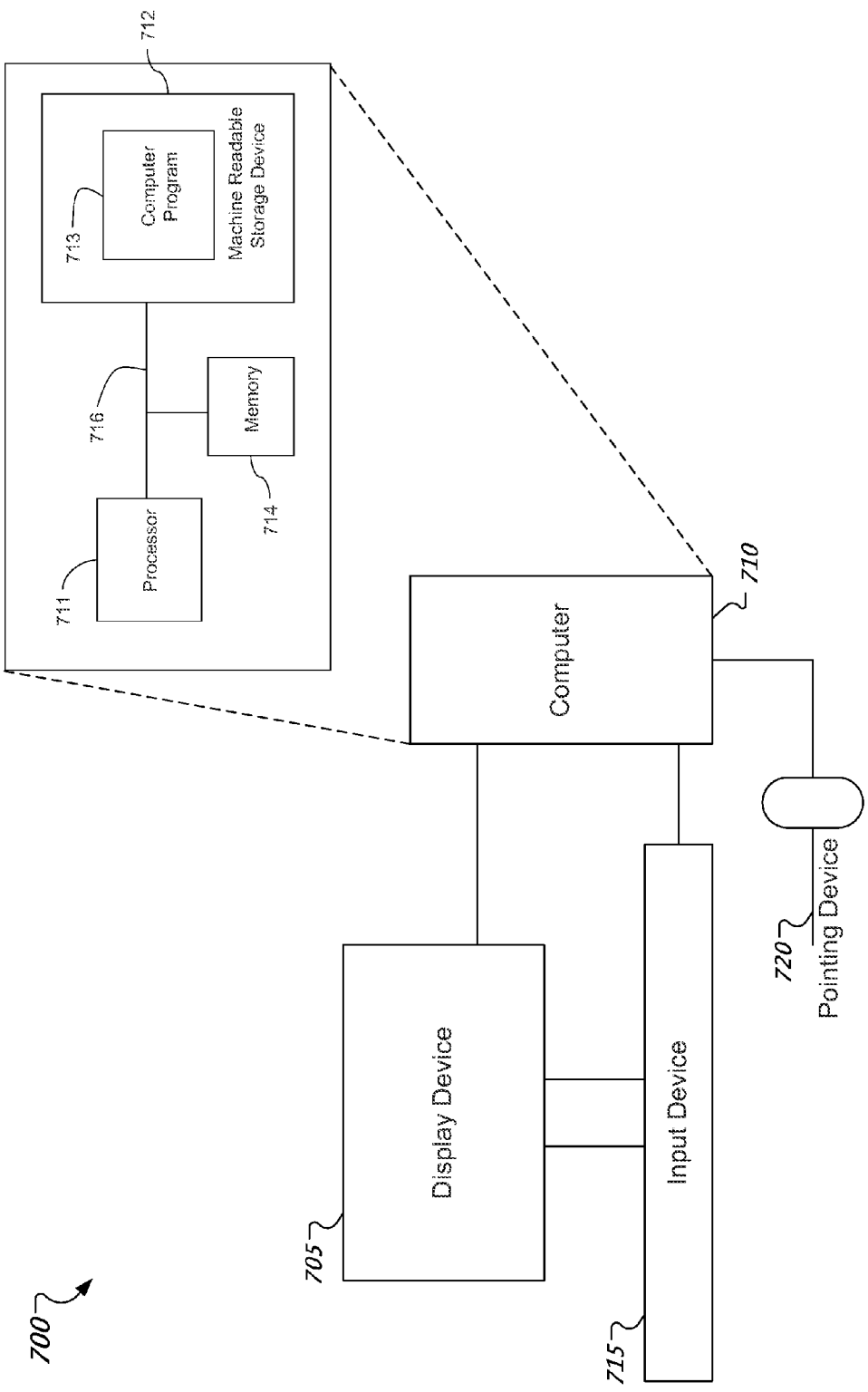
FIG. 7 is a schematic diagram of an example computer system that can be utilized to implement the systems and methods described herein.

FIG. 7 is a schematic diagram of an example computer system 700 that can be utilized to implement the systems and methods described herein. The computer system 700 includes a display device 705, a computer 710, an input device 715, and a pointing device 720. The software can be implemented in any suitable computer system 700, such as a desktop computer, laptop computer, personal digital assistant (PDA), smartphone, smartbook, netbook, or work station. Information can be displayed to a user using any suitable display device 705 including a cathode ray tube (CRT), a liquid crystal display (LCD) monitor, a graphic user interface, a display screen, and a touch screen. A user can use an input device 715 and any suitable pointing device 720, such as a mouse, joystick, track ball, stylus, or touch screen, to interact with, e.g., the channel capacity adaptive repeater software application. The display device 705, the input device 715, and the pointing device 720 can be operatively coupled with the computer 710 through wired or wireless means.

The channel capacity adaptive repeater software application can be executed by a central processing unit (CPU) within the computer 710 in accordance with an operating system, such as the Macintosh Operating System (Mac OS) X. The channel capacity adaptive repeater software application also can be executed on a computer system 700 hosting any other operating system, such as Microsoft Windows, UNIX, and Linux. The computer system 700 can be a stand-alone device such as a desktop computer. Alternatively, the computer system 700 can be implemented in a networked environment, where the channel capacity adaptive repeater software application is installed on a centralized server and accessed by a user through one or more nodes, such as work stations. The computer system 700 can display output on the display device 705.

The computer 710 can include a microprocessor, one or more communications buses and interfaces, a random access memory (RAM) and a read only memory (ROM). For example, the computer 710 can include a processor 711, a machine-readable storage device 712, a computer program 713, and a memory 714. Each of the components 711, 712, 713 and 714 can, for example, be interconnected using a system bus 716. The processor 711 is capable of processing instructions for execution within the computer 710. In some implementations, the processor 711 is a single-threaded processor. In some other implementations, the processor 711 is a multi-threaded processor. The processor 711 can process instructions stored in the memory 714 or on the machine-readable storage device 712. The memory 714 stores information within the computer 710. In some implementations, the memory 714 is a volatile memory unit. In some implementations, the memory 714 is a non-volatile memory unit. The machine-readable storage device 712 is capable of providing mass storage for the computer 710. In various implementations, the machine-readable storage device 712 can, for example, include a hard disk device, an optical disk device, or some other large capacity storage device.

In some implementations, the microprocessor can perform the operations specified by a user based on user input and instructions from RAM or ROM or both. In addition, the computer 710 can include a storage device to store content including multimedia data recorded using a recording instrument, as well as other additional content. The storage device can reside in the computer 710. Alternatively, the storage device can reside external to the computer 710. Also, the storage device can reside in the recording instrument. The recording instrument can be operatively coupled to the computer 710 through wired or wireless means to retrieve stored content. Generally, the computer 710 will also include, or be operatively coupled to receive data from, transfer data to, or both, one or more mass storage devices for storing data, e.g., magnetic, magneto-optical disks, or optical disks. However, the computer 710 need not have such devices. Moreover, the computer 710 can be embedded in another device, e.g., a mobile telephone, a PDA, a mobile audio or video player, a game console, a Global Positioning System (GPS) receiver, or a portable storage device, e.g., a universal serial bus (USB) flash drive. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. In some implementations, the processor 711 and the memory 714 can be supplemented by, or incorporated in, special purpose logic circuitry.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more exemplary aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. In some implementations, a computer program can correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. These computer programs can include machine instructions for a programmable processor, and can be implemented in high-level procedural and object-oriented programming languages, in addition to assembly and machine languages.

Implementations of the subject matter described in this specification can be implemented in a computing system that includes a back-end component, e.g., a data server, a middleware component, e.g., an application server, or a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), an inter-network, e.g., the Internet, and peer-to-peer networks, in addition to other such communication networks.

The computing system can include clients and servers. A client and server generally reside remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., as a result of the user interaction, can be received from the client device at the server.

Various modifications to the implementations described in this disclosure may be readily apparent to those skilled in the art, and the generic principles defined herein may be applied to other implementations without departing from the spirit or scope of this disclosure. Thus, the present disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by data processing apparatus, the method comprising:
   receiving a mobile broadcast signal including inner code and outer code information;
   generating an adjusted mobile broadcast signal by adjusting a bit rate of the mobile broadcast signal through modifying the outer code information by reducing outer code bits without modifying a modulation scheme associated with the mobile broadcast signal;
   combining additional content with the adjusted mobile broadcast signal, wherein the additional content is inserted in bit space vacated by the modifying of the outer code information; and
   transmitting the adjusted mobile broadcast signal combined with the additional content.

2. The method of claim 1, wherein transmitting the adjusted mobile broadcast signal occurs in a different frequency than a frequency associated with the received mobile broadcast signal.

3. The method of claim 1, wherein the combining the additional content with the adjusted mobile broadcast signal comprises multiplexing the additional content with the adjusted mobile broadcast signal.

4. The method of claim 1, further comprising modifying the inner code information.

5. The method of claim 4, wherein the modifying the inner code information comprises increasing a ratio of data bits to total bits transmitted.

6. The method of claim 5, wherein increasing the ratio of data bits to the total bits transmitted comprises reducing redundant inner code bits.

7. The method of claim 1, further comprising modifying the modulation scheme associated with the mobile broadcast signal by switching to a subcarrier modulation scheme supporting a higher bit rate.

8. The method of claim 7, wherein switching to the subcarrier modulation scheme includes switching from a QPSK subcarrier modulation scheme to a 16-QAM subcarrier modulation scheme.

9. The method of claim 1, wherein modifying the outer code information by reducing the outer code bits comprises increasing a ratio of data bits to the total bits transmitted.

10. The method of claim 1, wherein the mobile broadcast signal includes at least one of:
    a wide area operational infrastructure signal, and
    a local area operational infrastructure signal.

11. The method of claim 1, wherein transmitting the adjusted mobile broadcast signal occurs in an area smaller than an area associated with the received mobile broadcast signal.

12. A non-transitory computer storage medium encoded with a computer program, the program comprising instructions that when executed by data processing apparatus cause the data processing apparatus to perform operations comprising:
    receiving a mobile digital broadcast signal including inner code and outer code information;
    generating an adjusted mobile digital broadcast signal by adjusting a bit rate of the mobile digital broadcast signal through modifying the outer code information to increase a ratio of data bits to the total bits transmitted;
    determining an amount of additional content that can be combined with the adjusted mobile broadcast signal based on the increased ratio of data bits to the total bits transmitted;
    combining the determined amount of the additional content with the adjusted mobile digital broadcast signal; and
    transmitting the adjusted mobile digital broadcast signal combined with the determined amount of the additional content.

13. The computer storage medium encoded with a computer program of claim 12, wherein transmitting the adjusted mobile digital broadcast signal occurs in a different frequency than a frequency associated with the received mobile digital broadcast signal.

14. The computer storage medium encoded with a computer program of claim 12, wherein the combining the determined amount of the additional content with the adjusted mobile digital broadcast signal further comprises multiplexing the additional content with the adjusted mobile digital broadcast signal.

15. The computer storage medium encoded with a computer program of claim 14, wherein the multiplexed additional content is inserted in bit space vacated by the modifying the outer code information.

16. The computer storage medium encoded with a computer program of claim 12, further comprising modifying a modulation scheme associated with the mobile digital broadcast signal by switching to a subcarrier modulation scheme supporting a higher bit rate.

17. The computer storage medium encoded with a computer program of claim 16, wherein switching to the subcarrier modulation scheme includes switching from a QPSK subcarrier modulation scheme to a 16-QAM subcarrier modulation scheme.

18. The computer storage medium encoded with a computer program of claim 12 further comprising modifying the inner code information to increase a ratio of data bits to total bits transmitted.

19. The computer storage medium encoded with a computer program of claim 18, wherein the modifying the inner code information to increase the ratio of data bits to the total bits transmitted comprises reducing redundant inner code bits.

20. The computer storage medium encoded with a computer program of claim 12, wherein the modifying the outer code information to increase the ratio of data bits to the total bits transmitted comprises reducing redundant outer code bits.

21. The computer storage medium encoded with a computer program of claim 12, wherein the mobile digital broadcast signal includes at least one of:
a wide area operational infrastructure signal, and
a local area operational infrastructure signal.

22. The computer storage medium encoded with a computer program of claim 12, wherein transmitting the adjusted digital mobile broadcast signal occurs in an area smaller than an area associated with the received mobile digital broadcast signal.

23. An electronic device for adjusting data rate in a digital signal, the electronic device comprising:
a receiver operable to receive a wide area broadcast signal including inner code and outer code information;
a processor operable to generate a local area signal by adjusting a bit rate of the wide area broadcast signal through modifying the outer code information to change a ratio of data bits to the total bits transmitted; and
a transmitter operable to transmit the local area broadcast signal.

24. The electronic device of claim 23, wherein the transmitter is further operable to transmit the local area broadcast signal at a different frequency than a frequency associated with the received wide area broadcast signal.

25. The electronic device of claim 23, further comprising a multiplexer operable to multiplex local content with the local area broadcast signal.

26. The electronic device of claim 25, wherein the multiplexed local content is inserted in bit space vacated by the modifying the outer code information.

27. The electronic device of claim 23 further comprising modifying a modulation scheme associated with the wide area broadcast signal by switching to a subcarrier modulation scheme supporting a higher bit rate.

28. The electronic device of claim 27, wherein switching to the subcarrier modulation scheme includes switching from a QPSK subcarrier modulation scheme to a 16 QAM subcarrier modulation scheme.

29. The electronic device of claim 23 further comprising modifying the inner code information to increase a ratio of data bits to total bits transmitted.

30. The electronic device of claim 29, wherein the modifying the inner code information to increase the ratio of data bits to the total bits transmitted comprises reducing redundant inner code bits.

31. The electronic device of claim 23, wherein modifying the outer code information to change the ratio of data bits to the total bits transmitted comprises reducing redundant outer code bits.

32. The electronic device of claim 23, wherein the wide area broadcast signal includes at least one of:
wide area operational infrastructure content, and
local area operational infrastructure content.

33. The electronic device of claim 23, wherein transmitting the wide area broadcast signal occurs in an area smaller than an area associated with the local area broadcast signal.

34. An apparatus for adjusting data rate in a digital signal, comprising:
means for receiving a wide area broadcast signal including inner code and outer code information;
means for generating a micro-venue broadcast signal by adjusting a bit rate of the wide area broadcast signal through means for modifying at least one of:
a modulation scheme associated with the wide area broadcast signal,
the inner code information, and
the outer code information;
means for determining an amount of additional content that can be combined with the micro-venue broadcast signal based on the adjusted bit rate of the wide area broadcast signal;
means for combining the determined amount of the additional content with the micro-venue broadcast signal; and
means for transmitting the micro-venue broadcast signal combined with the determined amount of the additional content.

35. The apparatus of claim 34, wherein the means for transmitting the micro-venue broadcast signal includes means for transmitting the micro-venue broadcast signal at a different frequency than a frequency associated with the received wide area broadcast signal.

36. The apparatus of claim 34, wherein the means for combining the determined amount of the additional content with the micro-venue broadcast signal further comprises means for multiplexing the determined amount of the additional content with the micro-venue broadcast signal.

37. The apparatus of claim 36, wherein the multiplexed additional content is inserted in bit space vacated by the means for modifying at least one of:
the inner code information, and
the outer code information.

38. The apparatus of claim 34, wherein the means for modifying the modulation scheme associated with the wide area broadcast signal includes means for switching to a subcarrier modulation scheme supporting a higher bit rate.

39. The apparatus of claim 38, wherein the means for switching to the modulation subcarrier modulation scheme includes switching from a QPSK subcarrier modulation scheme to a 16-QAM subcarrier modulation scheme.

40. The apparatus of claim 34, wherein modifying the inner code information comprises increasing a ratio of data bits to total bits transmitted.

41. The apparatus of claim 40, wherein increasing the ratio of data bits to the total bits transmitted comprises reducing redundant inner code bits.

42. The apparatus of claim 34, wherein modifying the outer code information comprises increasing a ratio of data bits to the total bits transmitted.

43. The apparatus of claim 42, wherein increasing the ratio of data bits to the total bits transmitted comprises reducing redundant outer code bits.

44. The apparatus of claim 34, wherein the wide area broadcast signal includes at least one of:
wide area operational infrastructure content, and
local area operational infrastructure content.

45. The apparatus of claim 34, wherein transmitting the micro-venue broadcast signal occurs in an area smaller than an area associated with the received wide area broadcast signal.

46. A system for increasing data rate in a mobile signal, the system comprising:
 an electronic device, in communication with one or more communication devices, the electronic device including one or more processors configured to perform operations comprising:
  receiving a local area broadcast signal including inner code and outer code data;
  generating a micro-venue broadcast signal by adjusting a bit rate of the local area broadcast signal through modifying at least one of:
   a modulation scheme associated with the local area broadcast signal,
   the inner code information, and
   the outer code information by changing a number of bits associated with the outer code information; and
  transmitting the micro-venue broadcast signal to at least one of the one or more communication devices.

47. The system of claim 46, wherein transmitting the micro-venue broadcast signal to at least one of the one or more communication devices occurs in a different frequency than a frequency associated with the received local area broadcast signal.

48. The system of claim 46, wherein the operations further comprise determining an amount of additional content that can be combined with the micro-venue broadcast signal based on the changed number of bits associated with the outer code information and multiplexing the determined amount of the additional content with the micro-venue broadcast signal.

49. The system of claim 48, wherein the multiplexed local content is inserted in bit space vacated by the changing the number of bits associated with the outer code information.

50. The system of claim 46, wherein modifying the modulation scheme associated with the local area broadcast signal comprises switching to a subcarrier modulation scheme supporting a higher bit rate.

51. The system of claim 50, wherein switching to the subcarrier modulation scheme includes switching from a QPSK subcarrier modulation scheme to a 64 QAM subcarrier modulation scheme.

52. The system of claim 46, wherein modifying the inner code information comprises increasing a ratio of data bits to total bits transmitted.

53. The system of claim 52, wherein increasing the ratio of data bits to the total bits transmitted comprises reducing redundant inner code bits.

54. The system of claim 46, wherein changing the number of bits associated with the outer code information comprises increasing a ratio of data bits to the total bits transmitted.

55. The system of claim 54, wherein increasing the ratio of data bits to the total bits transmitted comprises reducing redundant outer code bits.

56. The system of claim 46, wherein the local area broadcast signal includes at least one of:
 a wide area operational infrastructure signal, and
 a local area operational infrastructure signal.

57. The system of claim 46, wherein transmitting the micro-venue broadcast signal occurs in an area smaller than an area associated with the received local area broadcast signal.

\* \* \* \* \*